(12) United States Patent
Mackey et al.

(10) Patent No.: US 7,218,124 B1
(45) Date of Patent: May 15, 2007

(54) CAPACITIVE SENSING APPARATUS DESIGNS

(75) Inventors: Bob Lee Mackey, San Jose, CA (US); Mykola Golovchenko, San Jose, CA (US)

(73) Assignee: Synaptics Incorporated, Santa Clara, CA (US)

( * ) Notice: Subject to any disclaimer, the term of this patent is extended or adjusted under 35 U.S.C. 154(b) by 0 days.

(21) Appl. No.: 11/343,452

(22) Filed: Jan. 30, 2006

(51) Int. Cl.
*G01R 27/26* (2006.01)

(52) U.S. Cl. ............... 324/660; 324/663; 324/686

(58) Field of Classification Search ......... 324/660, 324/663, 686
See application file for complete search history.

(56) References Cited

U.S. PATENT DOCUMENTS

| | | | | |
|---|---|---|---|---|
| 4,264,903 A | * | 4/1981 | Bigelow | 341/1 |
| 4,766,368 A | * | 8/1988 | Cox | 324/662 |
| 6,346,818 B2 | * | 2/2002 | Wilson et al. | 324/660 |
| 6,530,283 B2 | * | 3/2003 | Okada et al. | 73/780 |
| 6,828,801 B1 | * | 12/2004 | Burdick et al. | 324/658 |
| 2005/0264304 A1 | * | 12/2005 | Nakamura et al. | 324/681 |
| 2005/0270039 A1 | * | 12/2005 | Mackey | 324/660 |

* cited by examiner

*Primary Examiner*—Andrew H. Hirshfeld
*Assistant Examiner*—Timothy J. Dole

(57) ABSTRACT

One type of capacitive sensing apparatus has a sensing element that includes a first portion and a second portion adjacent opposite edges of a sensing region. Signals from the first and second portions are combined. Another type of apparatus includes: a first sensing element including first and second portions; a second sensing element including third and fourth portions; and a third sensing element including fifth and sixth portions. The first, third and fifth portions form a first pattern, and the second, fourth and sixth portions form a second pattern. The patterns are bilaterally symmetrical about a median of a sensing region. In another type of apparatus, an electrical conductor coupled to a first sensing element passes through a gap in a second sensing element. An electrical conductor coupled to the second sensing element is dimensioned such that a capacitive coupling to the second sensing element is compensated for the gap.

11 Claims, 20 Drawing Sheets

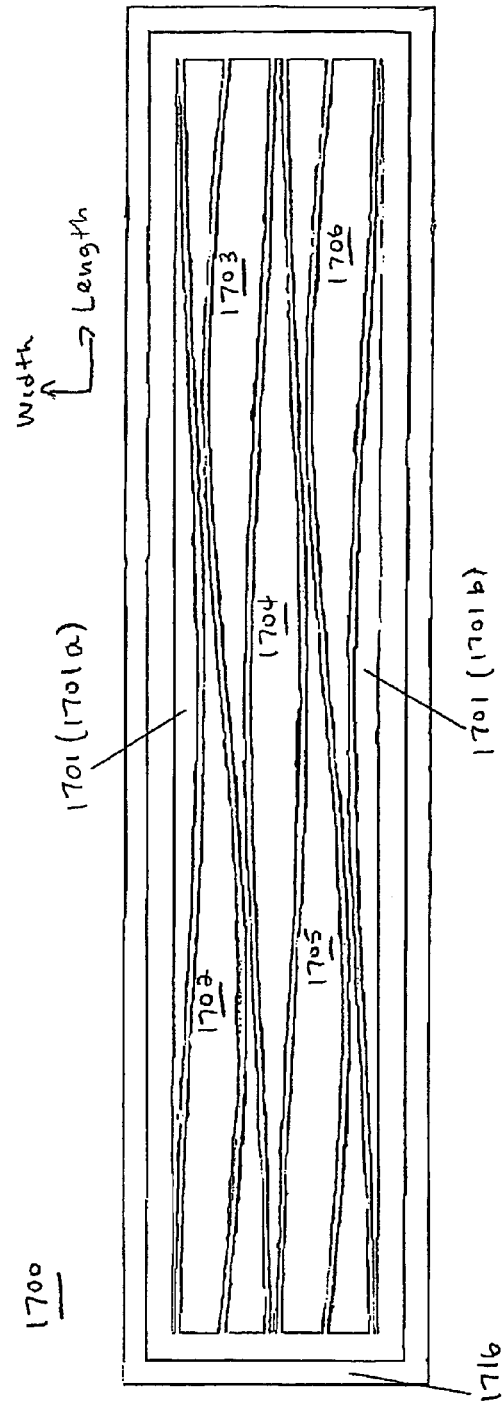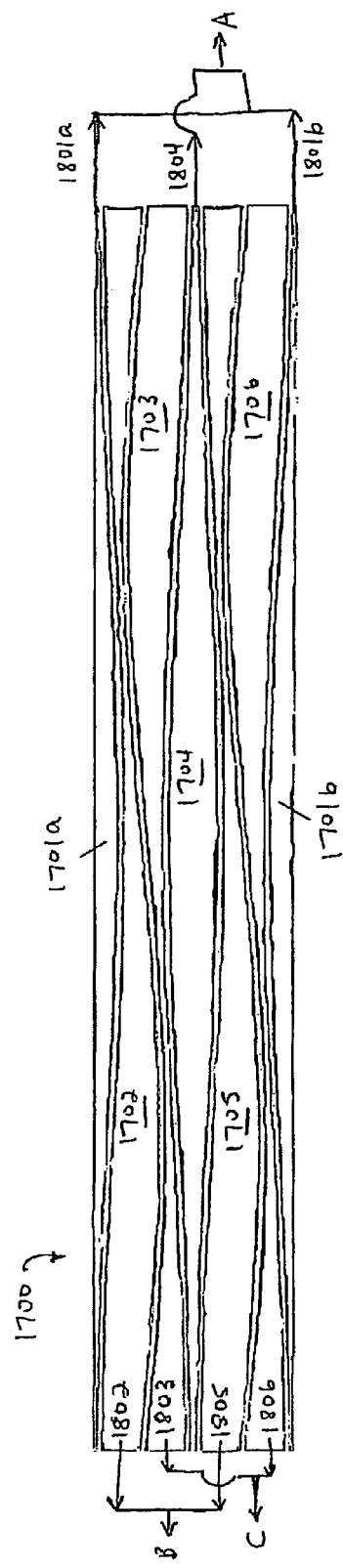

CAPACITIVE SENSING APPARATUS DESIGNS

BACKGROUND

Conventional computing devices provide a user with several ways to input a choice or a selection. For example, a user can use one or more keys of an alphanumeric keyboard communicatively connected to the computing device in order to indicate a choice or selection. Additionally, a user can use a cursor control device communicatively connected to the computing device to indicate a choice. Also, a user can use a microphone communicatively connected to the computing device to audibly indicate a particular selection. Moreover, touch-sensing technology can be used to provide an input selection to a computing device or other electronic device.

Within the broad category of touch sensing technology there exist capacitive sensing touch sensors. Among conventional capacitive touch sensors, there are different sensing technologies. For example, one sensing technology involves the use of sensing electrodes formed in triangular shapes wherein the direction of each triangle point alternates. However, there are disadvantages associated with this technique. For instance, one of the disadvantages is that as a finger (or object) moves towards the wide end of a first triangular shaped electrode and the narrow point of a second triangular shaped electrode, the narrow point electrode does not provide a quality signal because of its inherent signal-to-noise ratio. As such, this can be referred to as sensing geometry that induces signal-to-noise ratio concerns.

Another sensing technology uses a grid of conductive elements that cross over one another. While this design offers ease of signal interpretation, it also has the disadvantage of higher manufacturing cost. A further disadvantage affects multiple-layer sensors, as each layer degrades optical clarity of a capacitive touch sensor.

Another factor to consider in the design of a capacitive sensing apparatus is that the sensed position of a finger or object relative to the touch sensor should be unambiguous. That is, for example, the response of the sensing apparatus to a finger at any location on a touch sensor should be different from the response at other locations on the touch sensor.

Thus, a capacitive sensing apparatus that addresses one or more of the above-mentioned issues would be advantageous.

SUMMARY

Embodiments in accordance with the present invention pertain to capacitive sensing apparatuses that address one or more of the issues stated above.

In one embodiment, a capacitive sensing apparatus includes a number of electrically conductive sensing elements that have widths that vary and lengths that traverse a sensing region. The sensing elements include at least a first sensing element, a second sensing element and a third sensing element. The third sensing element includes a first variable-width portion disposed adjacent a first edge of the sensing region, and a second variable-width portion disposed adjacent a second edge of the sensing region opposite the first edge. A first sensor signal is output from the first sensing element and a second sensor signal is output from the second sensing element. The sensor signal output from the first portion and the sensor signal output from the second portion are combined to provide a third sensor signal. According to the present embodiment, the potential for an ambiguous sensor response is reduced or eliminated.

In another embodiment, a capacitive sensing apparatus includes a number of electrically conductive sensing elements that have widths that vary and lengths that traverse a sensing region. The sensing elements include: a first sensing element including a first variable-width portion and a second variable-width portion that produce a combined first sensor signal; a second sensing element including a third variable-width portion and a fourth variable-width portion that produce a combined second sensor signal; and a third sensing element including a fifth variable-width portion and a sixth variable-width portion that produce a combined third sensor signal. The first, third and fifth variable-width portions are arranged in a first pattern, and the second, fourth and sixth variable-width portions are arranged in a second pattern. The first pattern and the second pattern are bilaterally symmetrical about a median that is substantially equidistant from opposite edges of the sensing region. According to the present embodiment, the areas and the sensitivities of the sensing elements are essentially the same.

In yet another embodiment, a capacitive sensing apparatus includes at least a first sensing element and a second sensing element. The second sensing element has a first gap. A first electrical conductor coupled to the first sensing element passes through the first gap. A second electrical conductor coupled to the second sensing element is dimensioned such that a capacitive coupling to the second sensing element is compensated for the first gap. According to the present embodiment, the sensing apparatus can be built in a single layer of conductive material, reducing manufacturing costs.

BRIEF DESCRIPTION OF THE DRAWINGS

FIG. 17 illustrates another exemplary capacitive sensor pattern in accordance with embodiments of the present invention.

FIG. 18 illustrates how sensor signals in the pattern of FIG. 17 can be combined in accordance with embodiments of the present invention.

The drawings referred to in this description should not be understood as being drawn to scale except if specifically noted.

DETAILED DESCRIPTION

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
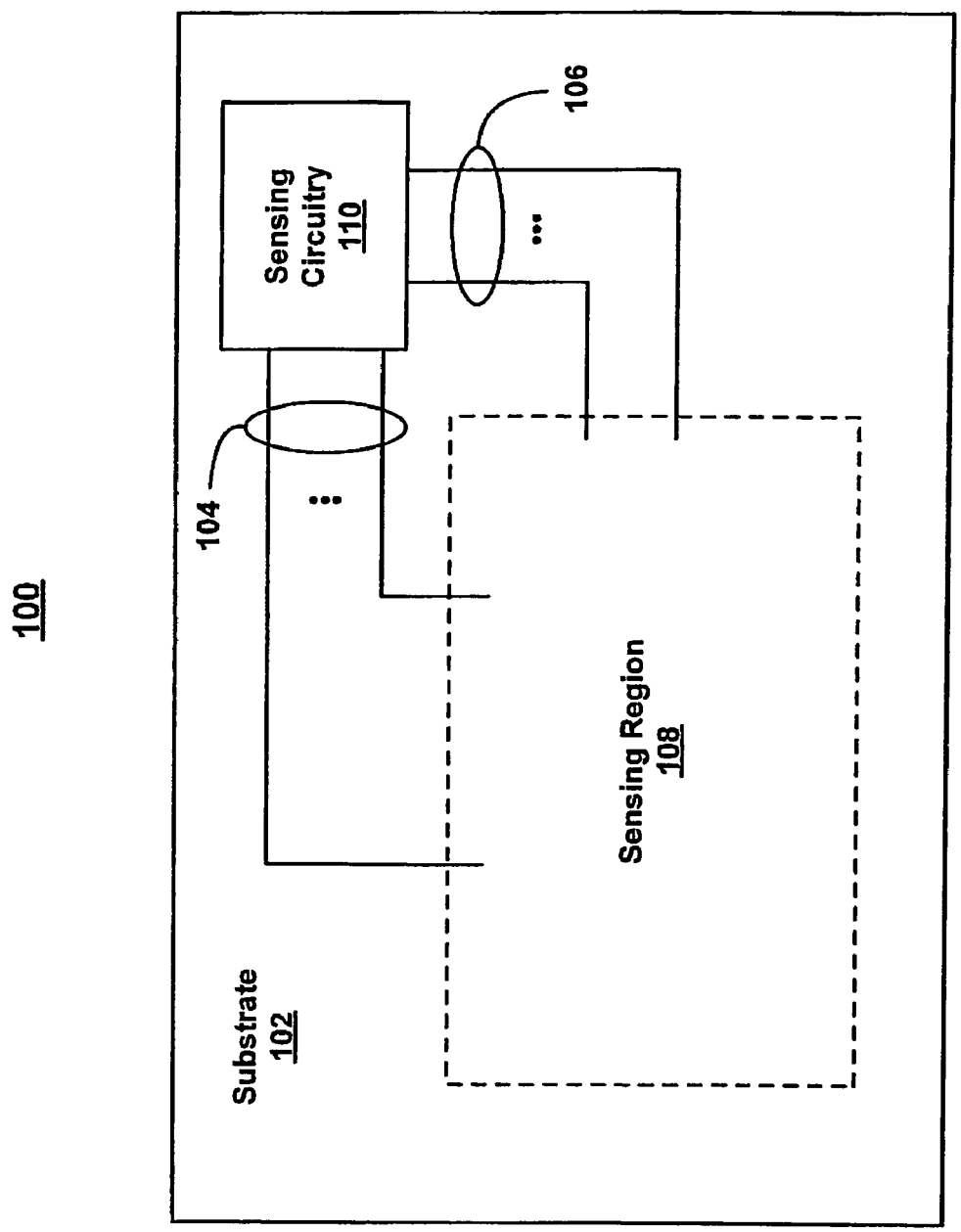
FIG. 1 is an exemplary capacitive touch sensor device that can be implemented to include one or more embodiments of the invention.

FIG. 1 is a plan view of an exemplary two-dimensional capacitive sensor apparatus 100 that can be implemented to include one or more embodiments of the present invention. The capacitive sensor apparatus 100 can be utilized to communicate user input (e.g., using a user's finger or a probe) to a computing device or other electronic device. For example, capacitive sensor apparatus 100 can be implemented as a capacitive touch sensor device that can be placed over an underlying image or an information display device (not shown). In this manner, a user would view the underlying image or information display by looking through the substantially transparent sensing region 108 of capacitive sensor apparatus 100 as shown. One or more embodiments in accordance with the present invention can be incorporated with a capacitive touch sensor device similar to capacitive sensor apparatus 100.

The capacitive sensor apparatus 100 when implemented as a touch sensor can include a substantially transparent substrate 102 having a first set of conductive coupling traces 104 and a second set of conductive coupling traces 106 patterned (or formed) thereon. Conductive coupling traces 104 and/or 106 can be utilized for coupling any sensing elements (not shown) or conductive traces that would form a sensing region 108 with sensing circuitry 110 thereby enabling the operation of capacitive sensor apparatus 100. Conductive coupling traces 104 and 106 may each include one or more conductive coupling elements or traces. Embodiments of sensing element patterns in accordance with the invention can be implemented to form sensing region 108.

Within FIG. 1, the capacitive sensor apparatus 100 can also be implemented as a capacitive touchpad device. For example, substrate 102 of capacitive sensor apparatus 100 can be implemented with, but is not limited to, one or more opaque materials that are utilized as a substrate for a capacitive touchpad device.

Figure 2:
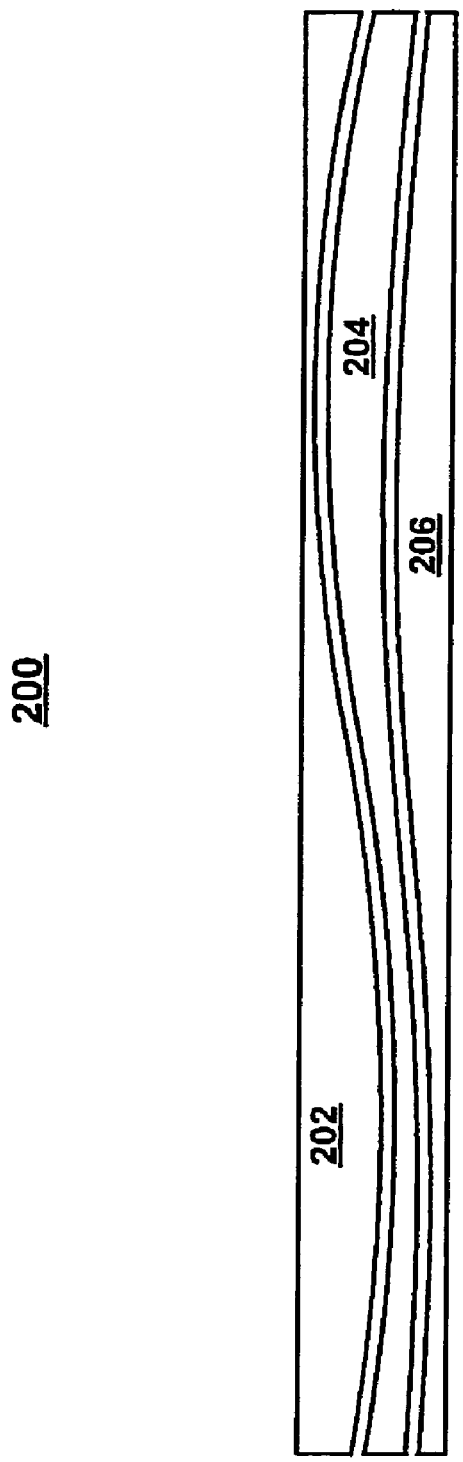
FIG. 2 illustrates an exemplary capacitive sensor pattern in accordance with embodiments of the invention.

FIG. 2 is a plan view of an exemplary capacitive sensor pattern 200 in accordance with embodiments of the invention. Specifically, sensor pattern 200 includes sensing elements 202, 204, and 206 having three phases which can be utilized as part of a two-dimensional capacitive sensor apparatus (e.g., 100), such as but not limited to, a touch sensor and/or a touchpad. When electrically coupled, sensor pattern 200 provides positioning information from a sensor pattern that has substantially parallel traces (or elements) with no crossovers. The positioning information can be derived from which of the sensing elements detects an object (e.g., a user's finger, a probe, and the like), and the proportional strength of the signals on sensing elements 202, 204, and 206.

Specifically, sensing elements 202, 204, and 206 can be oriented using a single layer of conductive material such that they are substantially parallel to a first axis and their capacitive coupling to the sensor surface can vary periodically along the length of each trace (or sensing element). In one embodiment, the widths of the sensing elements 202, 204, and 206 vary sinusoidally. For example, the widths of sensing elements 202, 204, and 206 can each be a sinusoidal function of position. However, the varying width of each sensing element 202, 204, and 206 can include all or a portion of a sinusoidal waveform. Additionally, the varying width of each sensing element 202, 204, and 206 can include multiple sinusoidal waveforms or any other type of waveform. The sum of the widths of traces 202, 204, and 206 can also be implemented as a substantial constant.

Within FIG. 2, the phases of traces 202, 204, and 206 can each be shifted relative to its neighbors, so that the sum of the traces 202, 204, and 206 produces a complementary set of signals. The sensing elements 202, 204, and 206 can differ in phase by any angle (e.g., substantially 24, 30, 36, 40, 45, 60, 72, 90, or 120 degrees, etc.). Within the present embodiment, sensing elements 202, 204, and 206 are each implemented to include less than one cycle (or period) of a sinusoidal waveform while each has a different phase. In this manner, each of the sensing elements 202, 204, and 206 produces a unique signal along its length. Therefore, the combination of the output signals produced by the sensing elements 202, 204, and 206 can specifically identify the location of an object (e.g., a user's finger, a probe, a stylus, etc.) along the length of sensor pattern 200. The sensing elements 202, 204, and 206 are located such that they are not required to overlap each other in order to determine a first location of an object along the first axis of a two-dimensional space.

The shape and phase of the sensing elements 202, 204, and 206 can be implemented in a wide variety of ways. For example, within the present embodiment, if the waveform shape of sensing element 202 is substantially equal to $\sin \theta$, then the waveform shape of sensing element 204 may be substantially equal to $\sin (\theta+120$ degrees$)$, while the waveform shape of sensing element 206 may be substantially equal to $\sin (\theta+240$ degrees$)$. Alternatively, the waveforms of sensing elements 204 and 206 may each be offset from the waveform of sensing element 202 by $2\pi/3$ radians. However, the phase and shape of the waveform of sensing elements 202, 204, and 206 are not in any way limited to the present embodiment.

Figure 4:
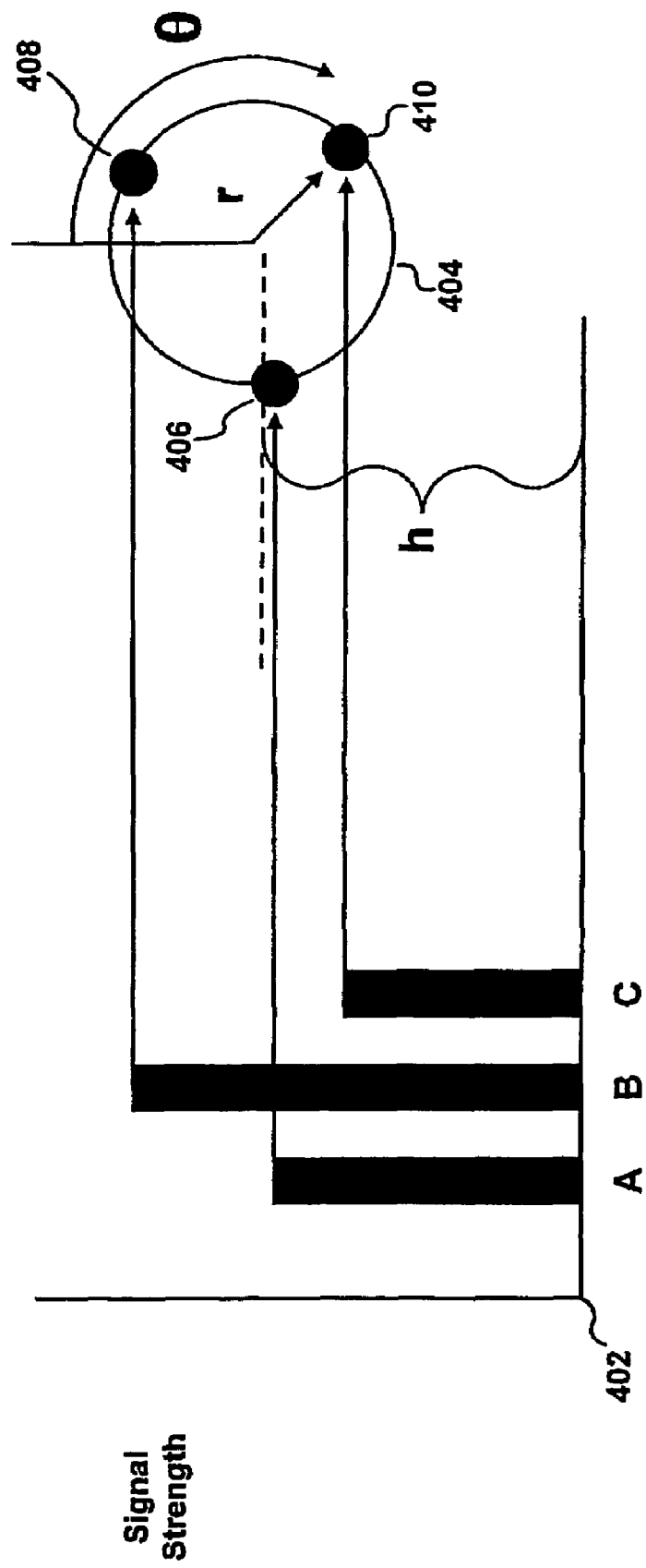
FIG. 4 illustrates an exemplary signal strength chart along with its conversion into polar coordinates in accordance with embodiments of the invention.

According to embodiments of the present invention, there are a wide variety of ways for determining a location (or position) of an object in relation to the length of sensor pattern 200 using signals output by sensing elements 202, 204, and 206. For instance, FIG. 4 illustrates an exemplary signal strength chart 402 along with its conversion into polar coordinates in accordance with embodiments of the invention. For example, suppose signal "A" is associated with sensing element 202 (FIG. 2), signal "B" is associated with sensing element 204, and signal "C" is associated with sensing element 206. As such, based on the signal strength shown within chart 402, it can be determined that the object is located along sensor 200 where sensing trace 204 is the widest, the sensing trace 202 is the second widest, and the sensing trace 206 is the third widest. Therefore, within this example, the object is located near the right-hand end of sensor pattern 200.

More specifically, signal A corresponds to sensing element 202, signal B corresponds to sensing element 204, and signal C corresponds to sensing element 206, as mentioned above. Further suppose that sensing elements (or traces) 202, 204, and 206 have been observed to give values $A_0$, $B_0$, and $C_0$, respectively, when no object is present or near sensor pattern 200. As such, let $a=A-A_0$, $b=B-B_0$, and $c=C-C_0$. Therefore, determination of the polar coordinates "h," "r" and the angle $\theta$ that are associated with signals A, B, and C can be performed, as described below.

Within FIG. 4, the value of "h" corresponds to the height of the center of a circle 404 upon which points 406, 408, and 410 can be located. The points 406, 408, and 410 are associated with signals A, B, and C, respectively. The value of "r" corresponds to the radius of circle 404. The value of angle $\theta$ can be used to indicate the linear location (or position) of an object in relationship to the length of sensor pattern 200. Specifically, the value of height "h" can be determined by using the following relationship:

$$h=(a+b+c)/3. \qquad (1)$$

Once "h" has been determined, the radius "r" can then be determined utilizing the following relationship:

$$r=sqrt((2/3)\times[(a-h)^2+(b-h)^2+(c-h)^2]), \qquad (2)$$

where "sqrt" represents the square root function. Once "r" has been determined, the angle $\theta$ can then be determined utilizing one of the following relationships:

$$\theta=\sin^{-1}((a-h)/r) \qquad (3)$$

or $$\theta=\sin^{-1}((b-h)/r) \qquad (4)$$

or $$\theta=\sin^{-1}((c-h)/r). \qquad (5)$$

Once the angle $\theta$ has been determined, it can then be converted into a distance that corresponds to a linear position measured along the length of sensor pattern 200 from one of its end points. For example, each degree of angle $\theta$ may be equal to a specific distance (e.g., a specific number of millimeters or inches) from one of the end points of sensor pattern 200. Alternatively, a lookup table may be utilized to ascertain the distance that corresponds to the determined $\theta$. The angle $\theta$ provides the location of the center of the object along sensor pattern 200 while the "h" and the "r" can provide information regarding the size of the object.

One of the advantages of determining the position along the first axis (e.g., X axis) of sensor pattern 200 in the manner described above is that common-mode noise has no effect on the determination of "r" and $\theta$.

Within FIG. 4, it is noted that angle $\theta$ can alternatively be determined utilizing the following relationships:

$$\cos \theta=a-(b+c)/2; \qquad (6)$$

$$\sin \theta=sqrt(3)/2(b-c); \qquad (7)$$

$$\theta=A\ TAN\ 2(\cos \theta, \sin \theta), \qquad (8)$$

where "A TAN 2" represents the arc tangent function. The above three relationships may be more convenient for use with a smaller microprocessor.

The sensing elements 202, 204, and 206 of sensor pattern 200 can be fabricated with any conductive material on any insulating substrate (e.g., 102). For example, this may include conventional copper/fiberglass printed circuit construction, ITO (indium tin oxide) patterned on glass, screen-printed conductor patterned on plastic, and the like. The sensor pattern 200 may be used to detect objects on either side of the substrate onto which it is fabricated. To prevent detection of signals of noise from one side of the substrate, a ground plane or a driven shield conductor may be utilized to shield that side.

There are advantages associated with the sensor pattern 200 of FIG. 2. For example, since the manufacture of sensor pattern 200 involves one layer of conductive material, this reduces manufacturing costs relative to the two-layer X-Y grids often used in touchpads. Additionally, in the case of touch sensors, doing all the fabrication using only one layer of conductive material eliminates low yield alignment steps. Furthermore, the optical properties of touch sensors can also benefit from the use of only one layer of substantially transparent conductive material, such as ITO.

Sensor pattern 200 can be implemented with a greater number of sensing elements than the sensing elements 202, 204, and 206 shown. However, if sensor pattern 200 is implemented with a greater number of sensing elements, the relationships described with reference to FIGS. 4 and 2 are modified accordingly in order to determine "h," "r" and θ.

Within FIG. 2, sensing elements 202, 204, and 206 of the sensor pattern 200 can individually be coupled with sensing circuitry 110 (FIG. 1) utilizing conductive coupling traces 104 and/or 106. When coupled in this manner, the sensor pattern 200 can be utilized to form the sensing region 108.

Figure 3:
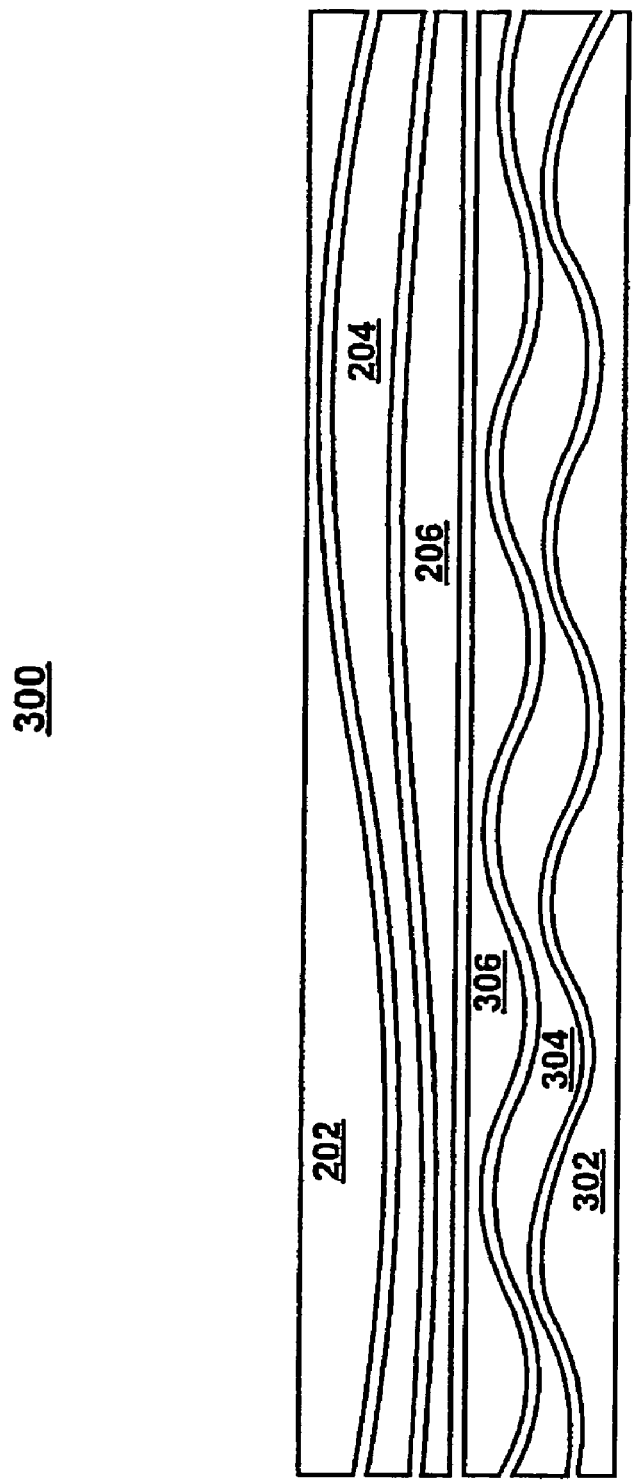
FIG. 3 illustrates another exemplary capacitive sensor pattern in accordance with embodiments of the invention.

FIG. 3 is a plan view of an exemplary capacitive sensor pattern 300 in accordance with embodiments of the invention. When electrically coupled, sensor pattern 300 can provide two-dimensional positioning information that has substantially parallel traces (or elements) with no crossovers. Additionally, sensor pattern 300 includes a low-frequency set of sensing elements (e.g., 202, 204, and 206) and a high-frequency set of sensing elements (e.g., 302, 304, and 306). These two sets can work together to provide "coarse" and "fine" positioning information.

Specifically, sensing elements 202, 204, and 206 can operate in any manner similar to that described above to provide the "coarse" positioning information corresponding to the linear position of an object (e.g., a user's finger, a probe, and the like) in relation to sensor pattern 300. For example, each of the signals associated with sensing elements 202, 204, and 206 can be utilized to determine the angle θ, as described above with reference to FIGS. 2 and 4. In this manner, the "coarse" position along the first axis (e.g., X axis) of sensor pattern 300 is determined to the first order.

The "fine" positioning information, or determination to the second order, can be obtained by utilizing sensing elements 302, 304, and 306. For example, each of the signals associated with sensing elements 302, 304, and 306 can be utilized to determine a second value θ in a manner similar to that described herein with reference to FIGS. 2 and 4. Because sensing elements 302, 304, and 306 include four periods (or cycles) of sinusoidal waveforms, the determined second value of θ can represent four different locations along traces 302, 304, and 306. However, because the "coarse" location is known with respect to sensing elements 202, 204, and 206, the second value of θ located closest to the "coarse" location can be used. In this manner, this second order determination provides a finer resolution of the location (or position) of the object in relation to sensor pattern 300.

Within FIG. 3, sensing elements 202, 204, and 206 of sensor pattern 300 can include a portion of a waveform, along with one or more waveforms. Additionally, sensing elements 302, 304, and 306 of sensor pattern 300 can include any number of waveforms, or a portion of a waveform. The sensing elements 302, 304, and 306 can be implemented in any manner that is different than the manner that sensing elements 202, 204, and 206 of sensor pattern 300 are implemented.

The sensing elements 202, 204, 206, 302, 304, and 306 of sensor pattern 300 can be fabricated with any conductive material on any insulating substrate (e.g., 102). For example, this may include conventional copper/fiberglass printed circuit construction, ITO patterned on glass, screen-printed conductor patterned on plastic, and the like. The sensor pattern 300 may be used to detect objects on either side of the substrate onto which it is fabricated. To prevent detection of signals of noise from one side of the substrate, a ground plane or a driven shield conductor may be utilized to shield that side.

Within FIG. 3, the "low-frequency" (or "coarse") set of sensing elements (e.g., 202, 204, and 206) of sensor pattern 300 can be implemented with a greater number of sensing elements than that shown. Moreover, the "high-frequency" (or "fine") set of sensing elements (e.g., 302, 304, and 306) of sensor pattern 300 can also be implemented with a greater number of sensing elements than that shown. However, if either the "coarse" set of sensing elements or "fine" set of sensing elements or both are implemented with a greater number of sensing elements, the relationships described with reference to FIGS. 2 and 4 would be modified accordingly in order to determine "h", "r", and θ.

It is appreciated that sensing elements 202, 204, 206, 302, 304, and 306 of the sensor pattern 300 can individually be coupled with sensing circuitry 110 (FIG. 1) utilizing conductive coupling traces 104 and/or 106. When coupled in this manner, the sensor pattern 300 can be utilized to form the sensing region 108. Sensor pattern 300 can be utilized in any manner similar to that described herein, but is not limited to such.

Figure 5:
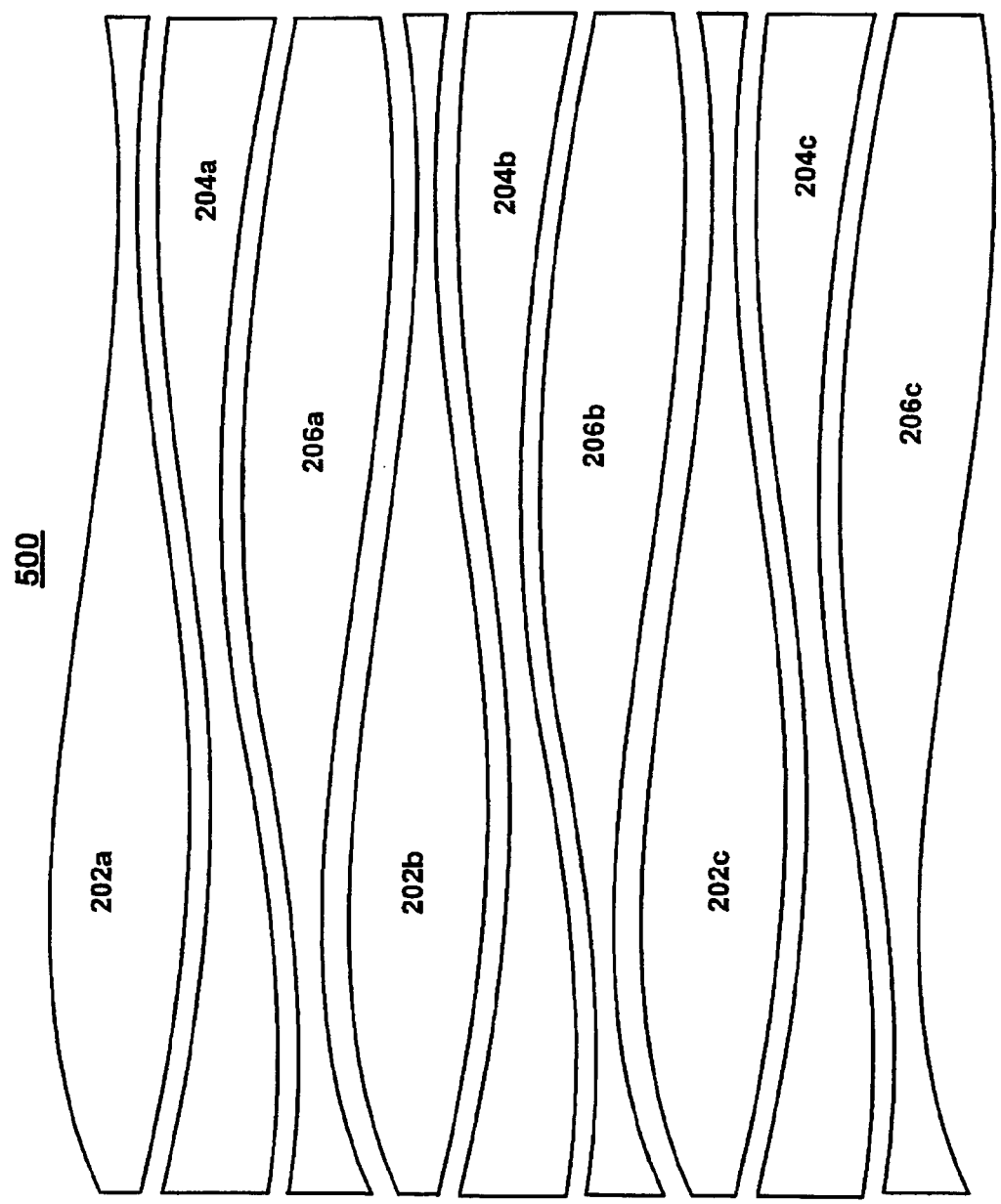
FIG. 5 illustrates yet another exemplary capacitive sensor pattern in accordance with embodiments of the invention.

FIG. 5 is a plan view of an exemplary capacitive sensor pattern 500 in accordance with embodiments of the invention. Specifically, sensor pattern 500 includes three repeated patterns similar to sensing elements 202a, 204a, and 206a having three phases which can be utilized as part of a two-dimensional capacitive sensor apparatus (e.g., 100), such as but not limited to, a touch sensor and/or a touchpad. When electrically coupled, sensor pattern 500 can provide two-dimensional positioning information that has substantially parallel traces (or sensing elements) with no crossovers. The sensor pattern 500 can be utilized in any manner similar to that described herein with reference to FIGS. 2 and 4. Additionally, any set of three adjacent traces can provide the signals for determining first-axis positioning of an object along the length of sensor pattern 500. Within the present embodiment, sensor pattern 500 includes nine traces that allow for seven sets of three adjacent traces. Sensor pattern 500 can be utilized in any manner similar to that described herein, but is not limited to such.

The sensing elements 202a, 204a, 206a, 202b, 204b, 206b, 202c, 204c, and 206c of sensor pattern 500 have been implemented in a different manner than the sensing elements 202, 204, and 206 of FIGS. 2 and 3. Specifically, each of the sensing elements 202a, 204a, 206a, 202b, 204b, 206b, 202c, 204c, and 206c does not include straight edges along its length. However, the sum of the widths of a set of sensing elements (e.g., 202a, 204a, and 206a) of sensor pattern 500 can be implemented as a substantial constant.

Within FIG. 5, each of the nine sensing elements 202a–206c of the sensor pattern 500 can be individually coupled with sensing circuitry 110 (FIG. 1) utilizing conductive coupling traces 104 and/or 106. When coupled in this manner, the sensor pattern 500 can be utilized to form the sensing region 108. Furthermore, when coupled in this manner, sensor pattern 500 can provide positioning information along a first axis (e.g., X axis), as described herein, and along a second axis (e.g., Y axis).

Specifically, each of the sensing elements 202a–206c of sensor pattern 500 can be utilized for determining a second location along a second axis (e.g., Y axis) that can be substantially perpendicular (or not parallel) to the first axis (e.g., X axis). For example, if sensing element 202a and 204a produce a strong signal while sensing element 204b and 206b produce a very weak signal, the sensing circuitry (e.g., 110) coupled with the sensor pattern 500 can determine that an object is located near sensing element 202a in the Y direction of the two-dimensional space. Alternatively, if sensing element 206c produces a strong signal while sensing element 202b produces a very weak signal, the sensing circuitry can determine that an object is located below or near sensing element 206c in the Y direction of the two-dimensional space. In this manner, sensor pattern 500 can be utilized to provide two coordinate positions associated with a two-dimensional space that correspond to the position of an object in relation to the sensor pattern 500.

Within FIG. 5, all of the similar sensing elements (e.g., 202a, 202b, and 202c) of sensor pattern 500 can be coupled together with sensing circuitry 110 (FIG. 1) utilizing conductive coupling traces 104 and/or 106. When coupled in this manner, the sensor pattern 500 can provide positioning information to the sensing circuitry 110 corresponding to the first axis (e.g. X axis), but not along the second axis (e.g., Y axis).

Sensor pattern 500 can be implemented with a greater or fewer number of sensing elements than shown within the present embodiment. Sensor pattern 500 and its sensing elements 202a, 204a, 206a, 202b, 204b, 206b, 202c, 204c, and 206c can be implemented in any manner similar to that described herein, but is not limited to such.

Within FIG. 5, each set (e.g., 206a, 202b, and 204b) of the sensing elements (e.g., 202a–206c) of sensor pattern 500 can operate in any manner similar to that described herein in order to provide the positioning information corresponding to the linear position of an object (e.g., a user's finger, a probe, and the like) in relation to sensor pattern 500. For example, each set of the signals associated with a set of sensing elements (e.g., 204b, 206b, and 202c) can be utilized to determine the angle θ, as described above with reference to FIGS. 2 and 4. In this manner, the position (or location) along the first axis (e.g., X axis) of sensor pattern 500 can be determined.

Figure 6:
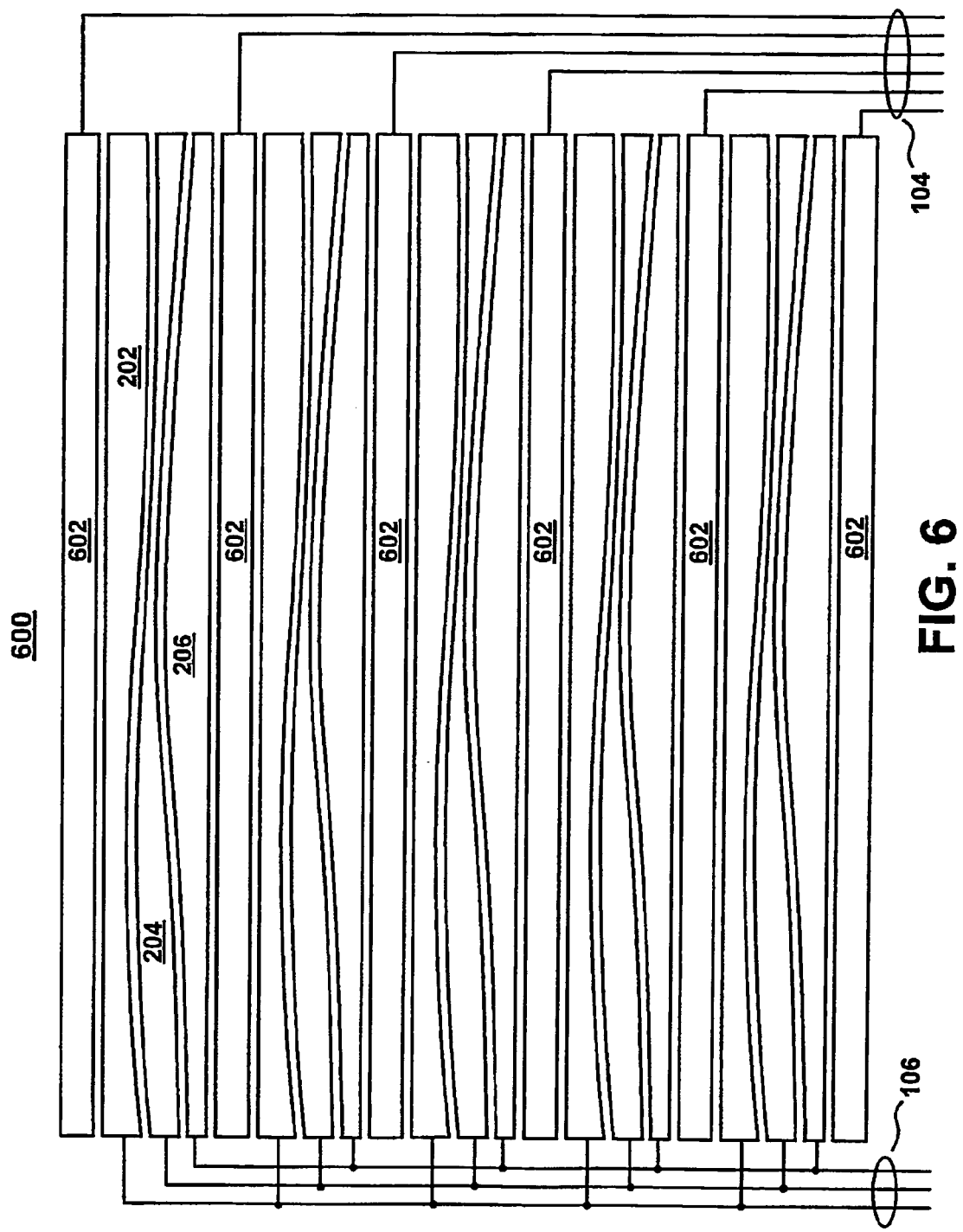
FIG. 6 illustrates still another exemplary capacitive sensor pattern in accordance with embodiments of the invention.

FIG. 6 is a plan view of an exemplary capacitive sensor pattern 600 in accordance with embodiments of the invention. Specifically, sensor pattern 600 includes five repeated patterns of a set of sensing elements 202, 204, and 206 having three phases which can be utilized as part of a two-dimensional capacitive sensor apparatus (e.g., 100), such as but not limited to, a touch sensor and/or a touchpad. Additionally, sensor pattern 600 includes second axis (e.g., Y axis) sensing elements 602 that are substantially parallel to the first axis, and interdigitated with each set of sensing elements 202, 204, and 206, and can be utilized for providing position information along the second axis. Sensor pattern 600 can provide two-dimensional positioning information that has substantially parallel traces (or sensing elements) with no crossovers. Sensor pattern 600 can be utilized in any manner similar to that described herein, but is not limited to such.

Each of the similar first axis sensing elements (e.g., 202) of sensor pattern 600 can be coupled together and coupled with sensing circuitry 110 (FIG. 1) utilizing, but not limited to, conductive coupling traces 106. However, each similar first axis-sensing element can be coupled together and coupled with sensing circuitry utilizing conductive coupling traces 104 and/or 106. Additionally, each of the second axis sensing elements (e.g., 602) can be coupled independently to sensing circuitry utilizing, but not limited to, conductive coupling traces 104. However, each of the second axis sensing elements 602 can be coupled individually with sensing circuitry utilizing conductive coupling traces 104 and/or 106. When coupled in this manner, the second axis sensing elements 602 can operate to provide positioning information corresponding to the second axis position of an object (e.g., a user finger, a probe, a stylus, etc.) relative to sensor pattern 600. Therefore, when coupled in this manner, the sensor pattern 600 can provide positioning information to the sensing circuitry corresponding to the first axis (e.g. X axis) along with the second axis (e.g., Y axis). The second axis is not parallel to the first axis and may be substantially perpendicular to it. The sensor pattern 600 can be utilized to form the sensing region 108.

Alternatively, each of the first axis sensing elements (e.g., 202, 204, and 206) of the sensor pattern 600 can be individually coupled with sensing circuitry 110 (FIG. 1) utilizing conductive coupling traces 104 and/or 106. When coupled in this manner, the sensor pattern 600 can be utilized to form the sensing region 108. Moreover, when coupled in this manner, the first axis sensing elements (e.g., 202, 204, and 206) of sensor pattern 600 can provide positioning information for both the first axis (e.g., X axis) and second axis (e.g., Y axis) since each trace can produce a signal that is individually detected by the sensing circuitry. However, when coupled in this manner, sensor pattern 600 can be implemented without the second axis sensing elements 602.

Sensor pattern 600 can be implemented with a greater or fewer number of sensing elements than shown within the present embodiment. Sensor pattern 600 and its sensing elements can be implemented in any manner similar to that described herein, but is not limited to such.

Within FIG. 6, each set of the first axis sensing elements (e.g., 202, 204, and 206) of sensor pattern 600 can operate in any manner similar to that described herein in order to provide the positioning information corresponding to the linear position of an object (e.g., a user's finger, a probe, and the like) in relation to sensor pattern 600. For example, each set of the signals associated with a set of sensing elements (e.g., 202, 204, and 206) can be utilized to determine the angle θ, as described above with reference to FIGS. 2 and 4. In this manner, the position (or location) along the first axis (e.g., X axis) of sensor pattern 600 is determined.

Figure 7:
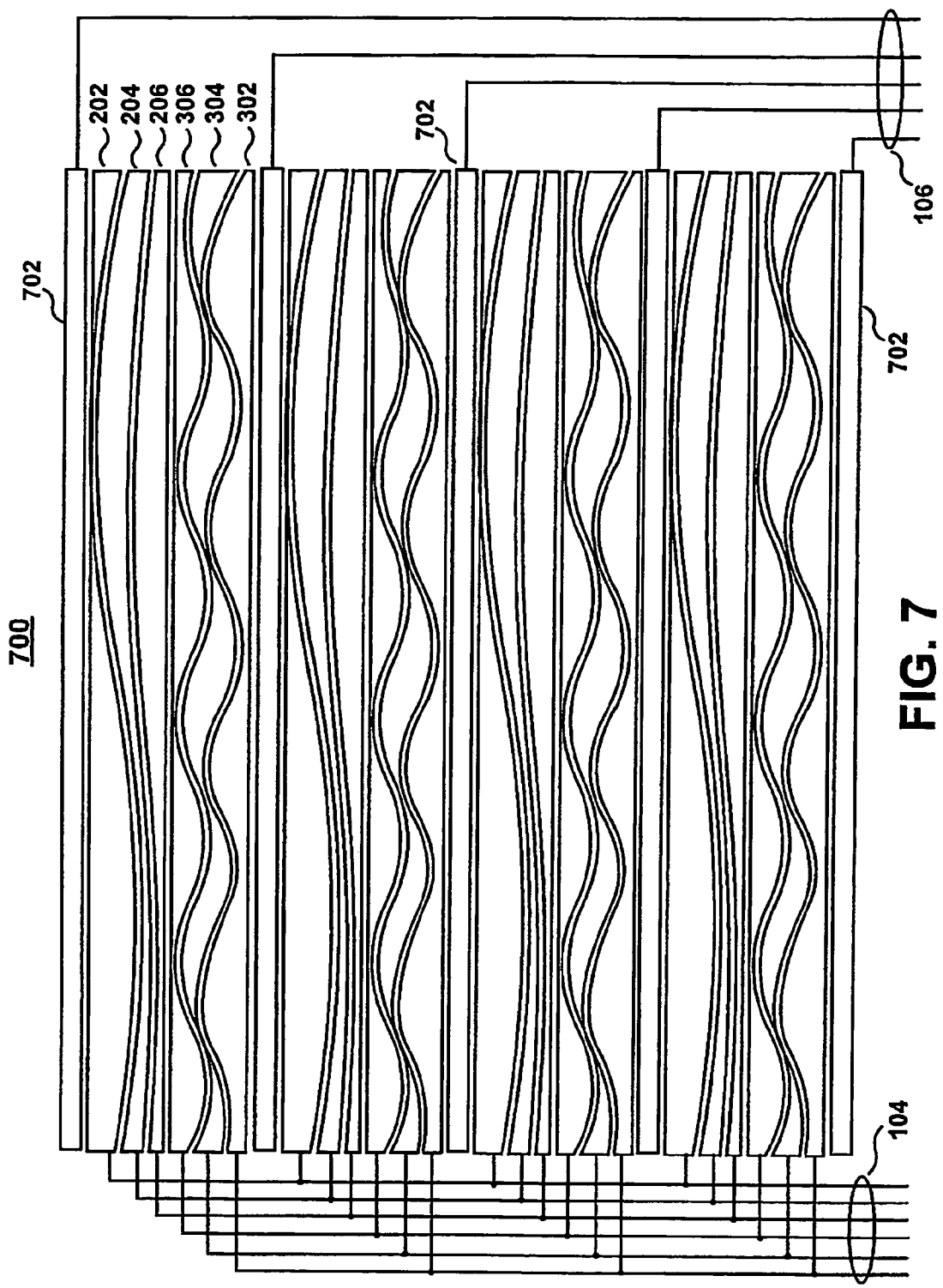
FIG. 7 illustrates another exemplary capacitive sensor pattern in accordance with embodiments of the invention.

FIG. 7 is a plan view of an exemplary capacitive sensor pattern 700 in accordance with embodiments of the invention. Specifically, sensor pattern 700 includes four repeated patterns of "coarse" and "fine" sets of sensing elements 202, 204, 206, 302, 304, and 306 which can be utilized as part of a two-dimensional capacitive sensor apparatus (e.g., 100), such as but not limited to, a touch sensor and/or a touchpad. Additionally, sensor pattern 700 includes second axis (e.g., Y axis) sensing elements 702 that are substantially parallel to the first axis, interdigitated with each set of sensing elements 202, 204, 206, 302, 304, and 306, and can be utilized for providing position information along the second axis. Sensor pattern 700 can provide two-dimensional positioning information that has substantially parallel traces (or sensing elements) with no crossovers. Sensor pattern 700 can be utilized in any manner similar to that described herein, but is not limited to such.

Each of the similar first axis sensing elements (e.g., 302) of sensor pattern 700 can be coupled together and coupled with sensing circuitry 110 (FIG. 1) utilizing, but not limited to, conductive coupling traces 104. However, each similar first axis-sensing element can be coupled together and coupled with sensing circuitry utilizing conductive coupling traces 104 and/or 106. Furthermore, each of the second axis sensing elements (e.g., 702) can be coupled independently to sensing circuitry utilizing, but not limited to, conductive coupling traces 106. However, each of the second axis sensing elements 702 can be coupled individually with sensing circuitry utilizing conductive coupling traces 104 and/or 106. When coupled in this manner, the sensor pattern 700 can be utilized to form the sensing region 108. Additionally, when coupled in this manner, the sensor pattern 700 can provide positioning information to the sensing circuitry corresponding to the first axis (e.g. X axis) along with the second axis (e.g., Y axis). The second axis is not parallel to the first axis and may be substantially perpendicular to it.

Alternatively, each of the first axis sensing elements (e.g., 202, 204, 206, 302, 304, and 306) of the sensor pattern 700 can be individually coupled with sensing circuitry 110 (FIG. 1) utilizing conductive coupling traces 104 and/or 106. When coupled in this manner, the sensor pattern 700 can be utilized to form the sensing region 108. Furthermore, when coupled in this manner, the first axis sensing elements (e.g., 202, 204, 206, 302, 304, and 306) of sensor pattern 700 can provide positioning information for both the first axis (e.g., X axis) and second axis (e.g., Y axis) since each trace can produce a signal that is individually detected by the sensing circuitry. However, when coupled in this manner, sensor pattern 700 can be implemented without the second axis sensing elements 702.

Sensor pattern 700 can be implemented with a greater or fewer number of sensing elements than shown within the present embodiment. Sensor pattern 700 and its sensing elements can be implemented in any manner similar to that described herein, but is not limited to such.

Within FIG. 7, each set of the first axis sensing elements (e.g., 202, 204, 206, 302, 304, and 306) of sensor pattern 700 can operate in any manner similar to that described herein to provide the positioning information corresponding to the linear position of an object (e.g., a user's finger, a probe, and the like) in relation to sensor pattern 700. For example, each set of the signals associated with a set of sensing elements (e.g., 202, 204, and 206) can be utilized to determine the angle θ, as described above with reference to FIGS. 2 and 4. In this manner, the position (or location) along the first axis (e.g., X axis) of sensor pattern 700 is determined.

Figure 8:
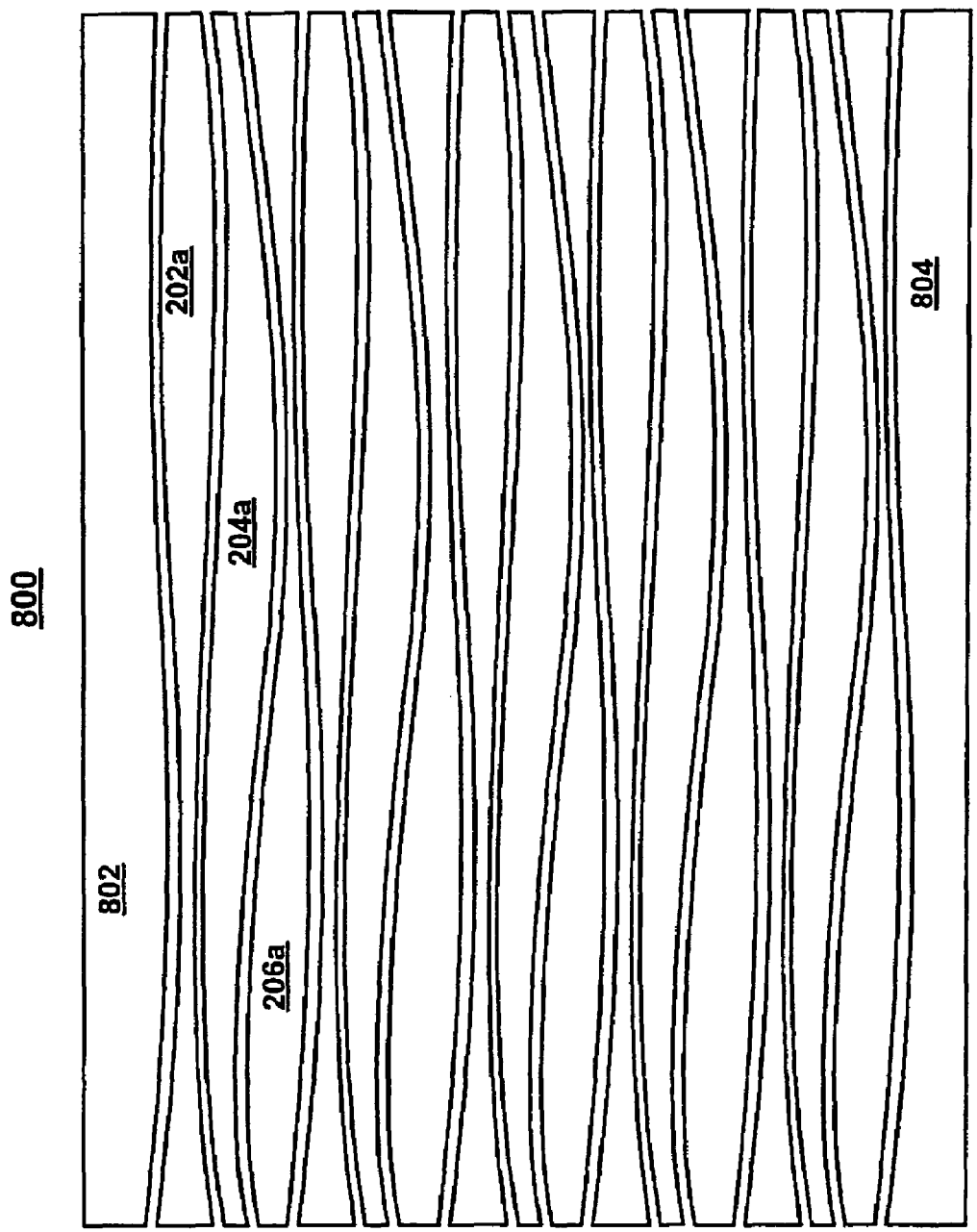
FIG. 8 illustrates yet another exemplary capacitive sensor pattern in accordance with embodiments of the invention.

FIG. 8 is a plan view of an exemplary capacitive sensor pattern 800 in accordance with embodiments of the invention. Specifically, sensor pattern 800 includes guard traces 802 and 804 along with five repeated patterns of sensing elements 202a, 204a, and 206a having three phases which can be utilized as part of a two-dimensional capacitive sensor apparatus (e.g., 100), such as, but not limited to, a touch sensor and/or a touchpad. When electrically coupled, sensor pattern 800 can provide two-dimensional positioning information that has substantially parallel traces (or sensing elements) with no crossovers. The sensor pattern 800 can be utilized in any manner similar to that described herein, but is not limited to such.

The five repeated patterns of sensing elements 202a, 204a, and 206a can operate in any manner similar to sensor pattern 500 of FIG. 5, described herein. However, sensor pattern 800 of FIG. 8 also includes guard traces 802 and 804 which are located at the "top" and "bottom," respectively, of sensor pattern 800 thereby enabling the "edge" sensing elements located near them to operate in a manner similar to those sensing elements more centrally located within sensor pattern 800 (here, "top" and "bottom" are relative terms). The guard traces 802 and 804 may be electrically driven, grounded, and/or held at a substantially fixed or constant potential in accordance with embodiments of the present invention.

For example, guard traces 802 and 804 of FIG. 8 may be coupled to ground; in this manner, guard traces 802 and 804 are functioning as grounded traces. Alternatively, guard traces 802 and 804 may be coupled to a constant potential signal; in this manner, guard traces 802 and 804 are functioning as constant potential traces. Guard traces 802 and 804 may also be actively driven; in this manner, guard traces 802 and 804 are functioning as driven guard traces. Guard traces 802 and 804 may be implemented in a wide variety of ways in accordance with the present embodiment.

Guard traces (or grounded or fix potential traces) similar to guard traces 802 and 804 can also be included as part of or with any sensing pattern described herein.

Figure 9:
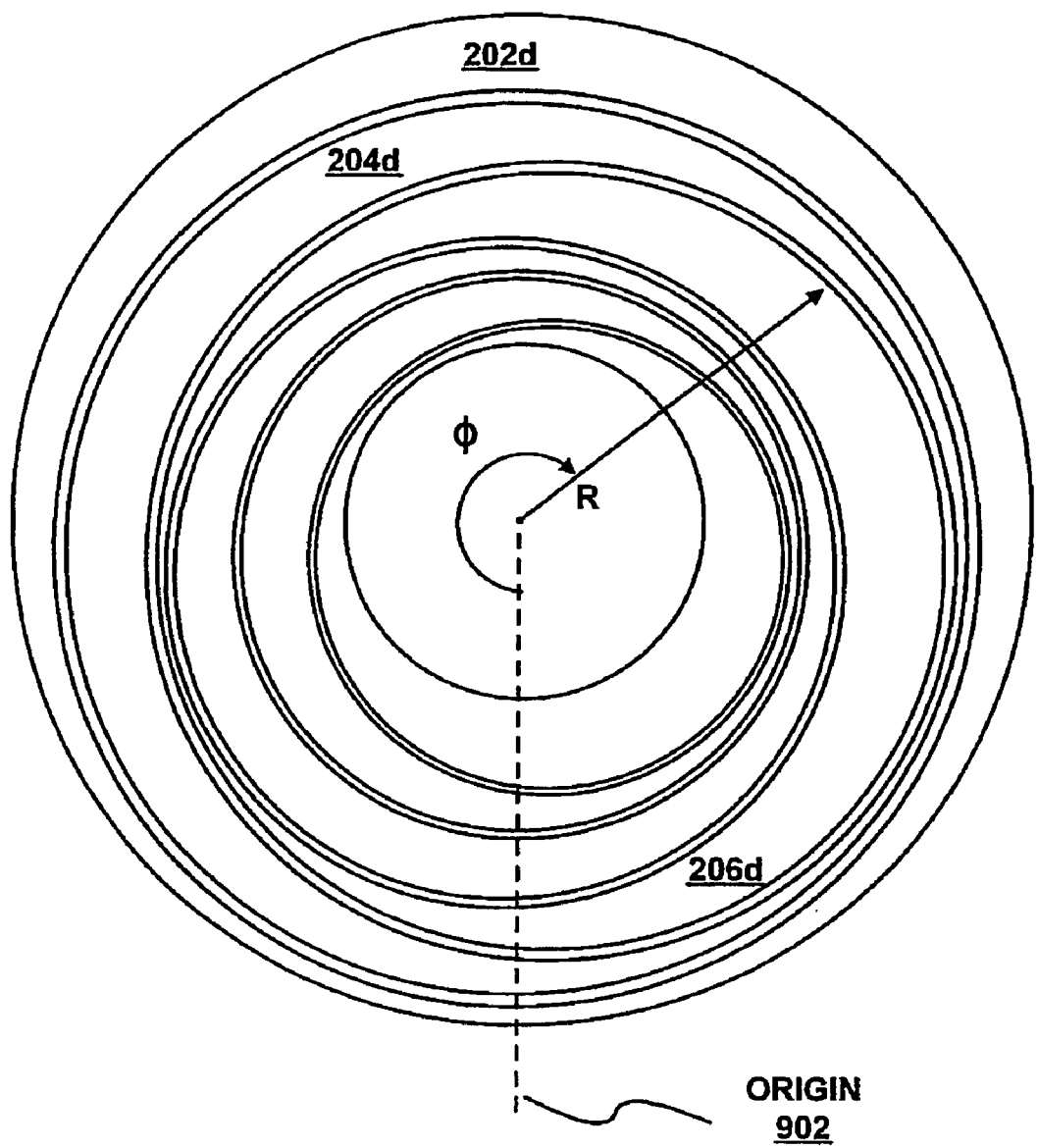
FIG. 9 illustrates an exemplary loop capacitive sensor pattern in accordance with embodiments of the invention.

FIG. 9 is a plan view of an exemplary loop capacitive sensor pattern 900 in accordance with embodiments of the invention. Specifically, sensor pattern 900 includes two sets of concentric loop patterns of three sensing elements 202d, 204d, and 206d having three phases which can be utilized as part of a two-dimensional capacitive sensor apparatus (e.g., 100), such as but not limited to, a touch sensor and/or a touchpad. When electrically coupled, sensor pattern 900 can provide continuous two-dimensional positioning information that has sensing elements with varying width and no crossovers. The sensor pattern 900 can be utilized in any manner similar to that described herein, but is not limited to such.

Specifically, each of the sensing elements 202*d*, 204*d*, and 206*d* has varying width and form a substantially circular (or loop) pattern. It is noted that a loop pattern may include any closed loop sensor pattern shape (e.g., circle, square, rectangle, triangle, polygon, etc.), radial arc sensor pattern, a semi-circle sensor pattern, and/or any sensor pattern that is not substantially in a straight line. The sensing elements 202*d*, 204*d*, and 206*d* are not required to overlap each other in order to determine an angular position φ of an object relative to the substantially circular pattern (e.g., loop) in a two-dimensional space. The angular position φ starts at an origin 902 which can be located anywhere associated with sensor pattern 900. The sensing elements 202*d*, 204*d*, and 206*d* provide a cumulative output signal that is substantially constant at different locations along the traces 202*d*, 204*d*, and 206*d*.

Within FIG. 9, the sensing elements 202*d*, 204*d*, and 206*d* can each include a conductive trace. Furthermore, each set of sensing elements (e.g., 202*d*, 204*d*, and 206*d*) can be used for determining a radial position "R" of the object relative to the loop in the two-dimensional space.

Each of the sensing elements (e.g., 202*d*, 204*d*, and 206*d*) of the sensor pattern 900 can be individually coupled with sensing circuitry 110 (FIG. 1) utilizing conductive coupling traces 104 and/or 106. When coupled in this manner, the sensor pattern 900 can be utilized to form the sensing region 108. Furthermore, when coupled in this manner, sensor pattern 900 can provide positioning information along the angular position φ and the radial position R.

Alternatively, all similar sensing elements (e.g., 202*d*) of sensor pattern 900 can be coupled together and coupled with sensing circuitry 110 (FIG. 1) utilizing conductive coupling traces 104 and/or 106. When coupled in this manner, the sensor pattern 900 can provide positioning information to the sensing circuitry corresponding to the angular position φ, but not of the radial position R. The radial position R can be determined in any manner similar to the way the second axis position can be determined, as described herein.

Sensor pattern 900 can be implemented with a greater or fewer number of sensing elements than shown within the present embodiment. For example, sensor pattern 900 can be implemented with a single set of sensing elements 202*d*, 204*d*, and 206*d*. Alternatively, sensor pattern 900 can be implemented with multiple sets of sensing elements 202*d*, 204*d*, and 206*d*. Sensor pattern 900 and its sensing elements can be implemented in any manner similar to that described herein, but is not limited to such.

Within FIG. 9, each set of the sensing elements (e.g., 202*d*, 204*d*, and 206*d*) of sensor pattern 900 can operate in any manner similar to that described herein in order to provide the positioning information corresponding to the angular position φ of an object (e.g., a user's finger, a probe, a stylus, and the like) in relation to sensor pattern 900. For example, each set of the signals associated with a set of sensing elements (e.g., 202*d*, 204*d*, and 206*d*) can be utilized to determine the phase angle θ, in a manner similar to that described herein with reference to FIGS. 2 and 4. Once the phase angle θ has been determined, it may be converted into a geometric position angle φ relative to the origin 902. In this manner, the angular position φ of an object is determined relative to sensor pattern 900.

The "coarse" or "fine" waveform patterns may have wavelengths that differ from the circumference of the loop sensor.

Figure 10:
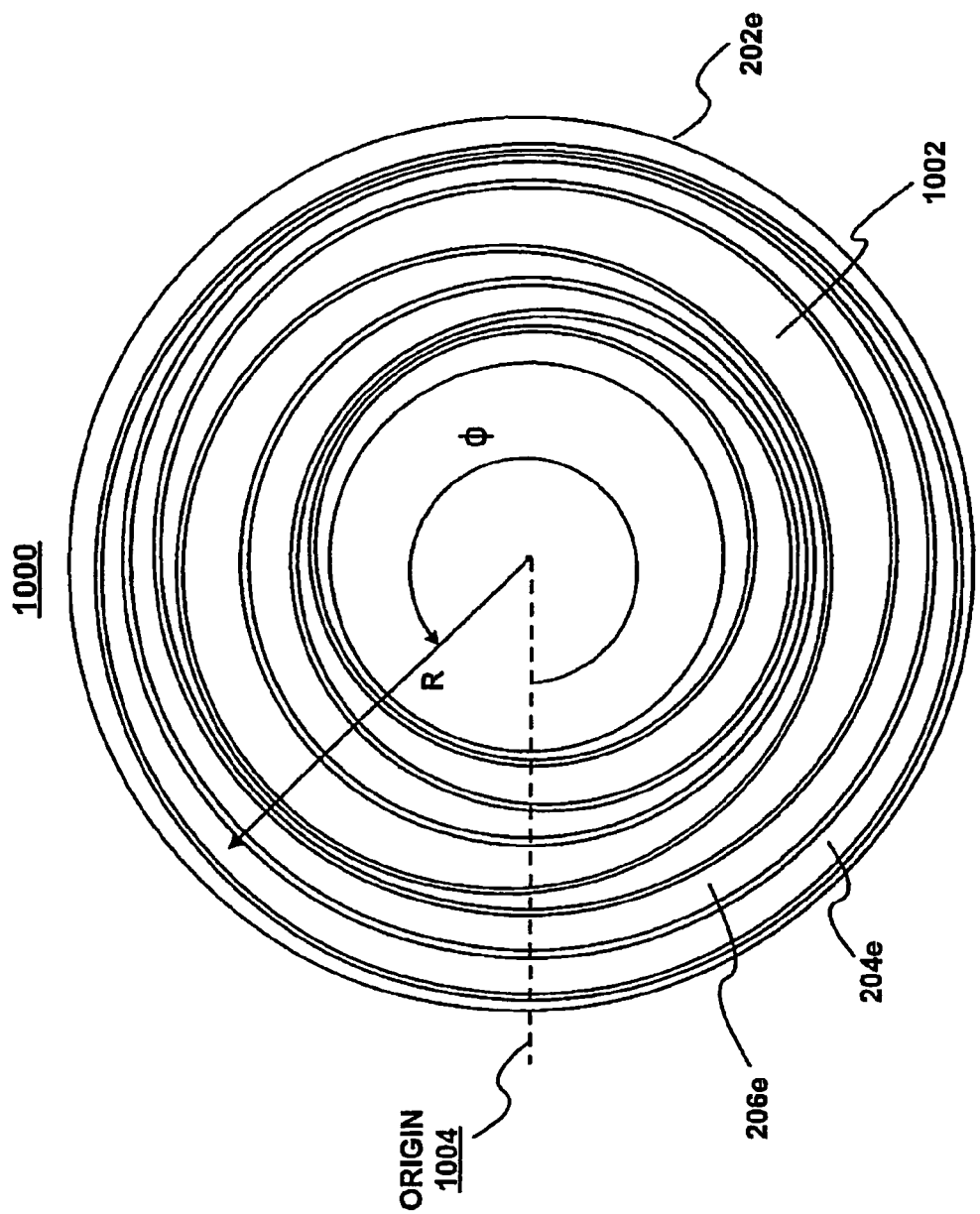
FIG. 10 illustrates another exemplary loop capacitive sensor pattern in accordance with embodiments of the invention.

FIG. 10 is a plan view of an exemplary loop capacitive sensor pattern 1000 in accordance with embodiments of the invention. Specifically, sensor pattern 1000 includes two sets of concentric loop patterns of four sensing elements 202*e*, 204*e*, 206*e*, and 1002 having four phases which can be utilized as part of a two-dimensional capacitive sensor apparatus (e.g., 100), such as but not limited to, a touch sensor and/or a touchpad. When electrically coupled, sensor pattern 1000 can provide continuous two-dimensional positioning information that has sensing elements with varying width and no crossovers. The sensor pattern 1000 can be utilized in any manner similar to that described herein, but is not limited to such.

Specifically, each of the sensing elements 202*e*, 204*e*, 206*e*, and 1002 has varying width and form a substantially circular (or loop) pattern. Sensing element 1002 can operate and be implemented in any manner similar to that described herein with reference to a sensing element. A loop pattern can include any closed loop sensor pattern shape (e.g., circle, square, rectangle, triangle, polygon, etc.), radial arc sensor pattern, a semi-circle sensor pattern, and/or any sensor pattern that is not substantially in a straight line. The sensing elements 202*e*, 204*e*, 206*e*, and 1002 are not required to overlap each other in order to determine an angular position φ of an object relative to the substantially circular pattern (e.g., loop) in two-dimensional space. The angular position φ starts at an origin 1004 which can be located anywhere associated with sensor pattern 1000. The sensing elements 202*e*, 204*e*, 206*e*, and 1002 provide a cumulative output signal that is substantially constant at different locations along the traces 202*e*, 204*e*, 206*e*, and 1002.

Within FIG. 10, the sensing elements 202*e*, 204*e*, 206*e*, and 1002 can each include a non-conductive region formed by two or more adjacent elements. Additionally, the sensing elements 202*e*, 204*e*, 206*e*, and 1002 can each include a conductive trace. Furthermore, each set of sensing elements (e.g., 202*e*, 204*e*, 206*e*, and 1002) can also be used for determining a radial position "R" of the object relative to the pattern 1000 in the two-dimensional space.

Each of the sensing elements (e.g., 202*e*, 204*e*, 206*e*, and 1002) of the sensor pattern 1000 can be individually coupled with sensing circuitry 110 (FIG. 1) utilizing conductive coupling traces 104 and/or 106. When coupled in this manner, the sensor pattern 800 can be utilized to form the sensing region 108. Furthermore, when coupled in this manner, sensor pattern 1000 can provide positioning information along the angular position φ and the radial position R.

Alternatively, all similar sensing elements (e.g., 202*e*) of sensor pattern 1000 can be coupled together and coupled with sensing circuitry 110 (FIG. 1) utilizing conductive coupling traces 104 and/or 106. When coupled in this manner, the sensor pattern 1000 can provide positioning information to the sensing circuitry corresponding to the angular position φ, but not of the radial position R. The radial position R can be determined in any manner similar to the way the second axis position can be determined, as described herein.

Sensor pattern 1000 can be implemented with a greater or fewer number of sensing elements than shown within the present embodiment. Sensor pattern 1000 and its sensing elements can be implemented in any manner similar to that described herein, but is not limited to such.

Within FIG. 10, each set of the sensing elements (e.g., 202e, 204e, 206e, and 1002) of sensor pattern 1000 can operate in any manner similar to that described herein in order to provide the positioning information corresponding to the angular position φ of an object (e.g., a users finger, a probe, a stylus, and the like) in relation to sensor pattern 1000. For example, each set of the signals associated with a set of sensing elements (e.g., 202e, 204e, 206e, and 1002) can be utilized to determine the phase angle θ, in a manner similar to that as described herein with reference to FIGS. 2 and 4. Once the phase angle θ has been determined, it may be converted into a geometric position angle φ, relative to the origin 1004. In this manner, the angular position φ of an object relative to sensor pattern 1000 is determined.

Figure 11:
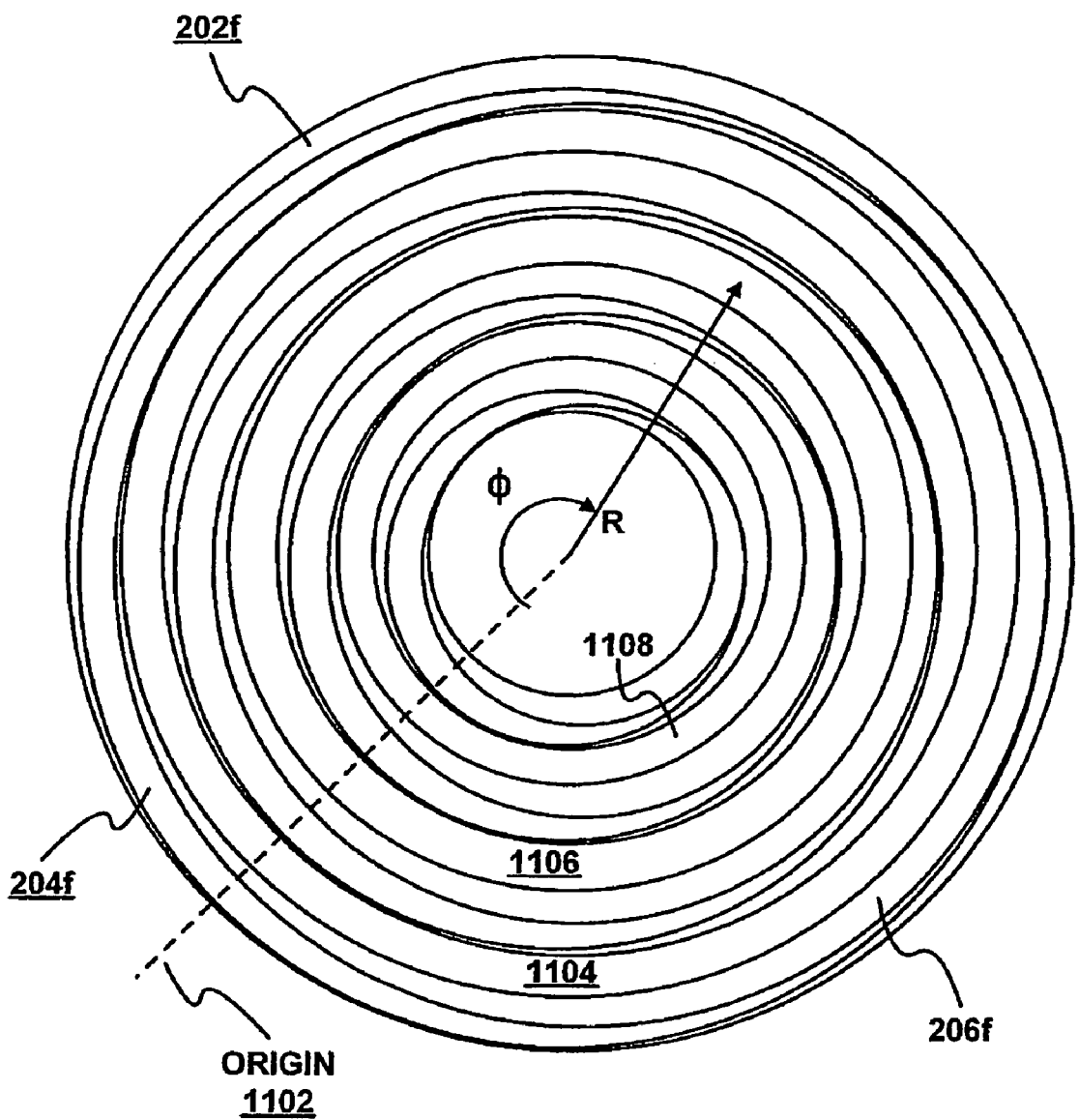
FIG. 11 illustrates yet another exemplary loop capacitive sensor pattern in accordance with embodiments of the invention.

FIG. 11 is a plan view of an exemplary loop capacitive sensor pattern 1100 in accordance with embodiments of the invention. Specifically, sensor pattern 1100 includes substantially "fixed" width sensing elements 1104, 1106, and 1108 along with four sets of concentric loop patterns of three sensing elements 202f, 204f, and 206f having three phases which can be utilized as part of a two-dimensional capacitive sensor apparatus (e.g., 100), such as but not limited to, a touch sensor and/or a touchpad. When electrically coupled, sensor pattern 1100 can provide continuous two-dimensional positioning information that includes sensing elements with varying width and no crossovers. The sensor pattern 1100 can be utilized in any manner similar to that described herein, but is not limited to such.

Each of the "fixed" width sensing elements 1104, 1106, and 1108 of sensor pattern 1100 can be individually coupled with sensing circuitry 110 (FIG. 1) utilizing conductive coupling traces 104 and/or 106. When coupled in this manner, sensing elements 1104, 1106, and 1108 can be utilized to provide positioning information to the sensing circuitry 110 associated with the radial position R of an object (e.g., a user's finger, a probe, a stylus, and the like) in relation to sensor pattern 1100. Additionally, each of the similar sensing elements of the four sets of sensing elements 202f, 204f, and 206f can be coupled together and coupled with sensing circuitry 110 (FIG. 1) utilizing conductive coupling traces 104 and/or 106. When coupled in this manner, the four sets of sensing elements 202f, 204f, and 206f can provide positioning information to the sensing circuitry 110 corresponding to the angular position φ of the object relative to an origin 1102.

Therefore, the constant width sensing elements 1104, 1106, and 1108 of FIG. 11 can provide radial position R information to the sensing circuitry corresponding to the object while the four sets of sensing elements 202f, 204f, and 206f can provide angular position φ information to the sensing circuitry associated with the sensor.

Each of the "fixed" width sensing elements 1104, 1106, and 1108 of sensor pattern 1100 are implemented with a width that is substantially fixed or constant. The radial position R of sensor pattern 1100 can be determined in any manner similar to the way the second axis position can be determined, as described herein. The origin 1102 can be located anywhere with respect to sensor pattern 1100.

Figure 12:
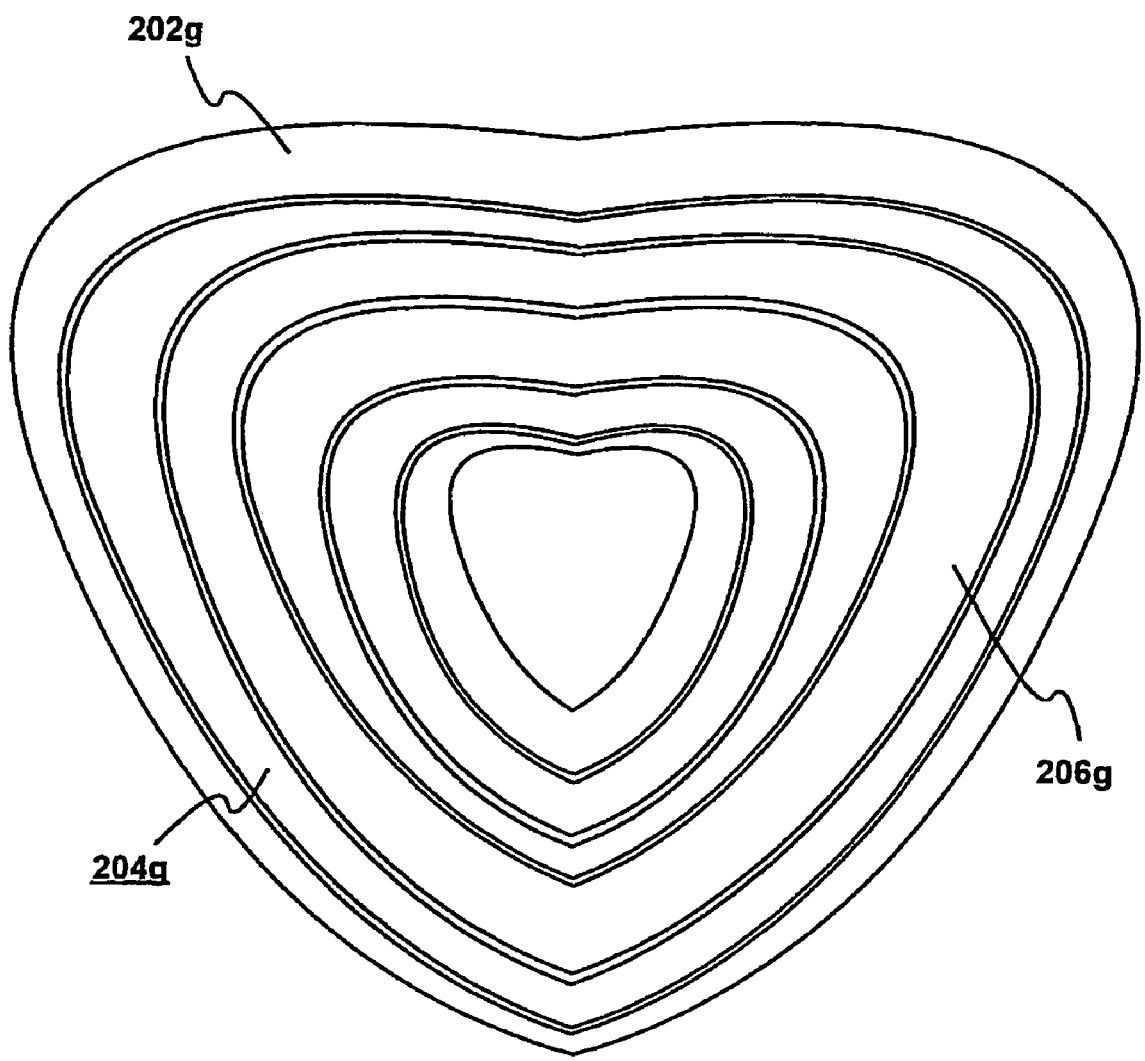
FIG. 12 illustrates still another exemplary loop capacitive sensor pattern in accordance with embodiments of the invention.

FIG. 12 is a plan view of an exemplary loop capacitive sensor pattern 1200 in accordance with embodiments of the invention. Specifically, sensor pattern 1200 includes two sets of non-concentric loop patterns of three sensing elements 202g, 204g, and 206g having three phases which can be utilized as part of a two-dimensional capacitive sensor apparatus (e.g., 100), such as but not limited to, a touch sensor and/or a touchpad. When electrically coupled, sensor pattern 1200 can provide continuous two-dimensional positioning information that has sensing elements with varying width and no crossovers. The sensor pattern 1200 can be utilized in any manner similar to that described herein, but is not limited to such.

Sensor pattern 1200 can operate in any manner similar to sensor pattern 900 of FIG. 9. Furthermore, the sum of the widths of any three adjacent traces (or sensing elements) of sensor pattern 1200 can be implemented as a substantial constant width. The sensor pattern 1200 can be implemented with a greater or fewer number of sensing elements than shown within the present embodiment. Sensor pattern 1200 and its sensing elements can be implemented in any manner similar to that described herein, but is not limited to such.

Figure 13:
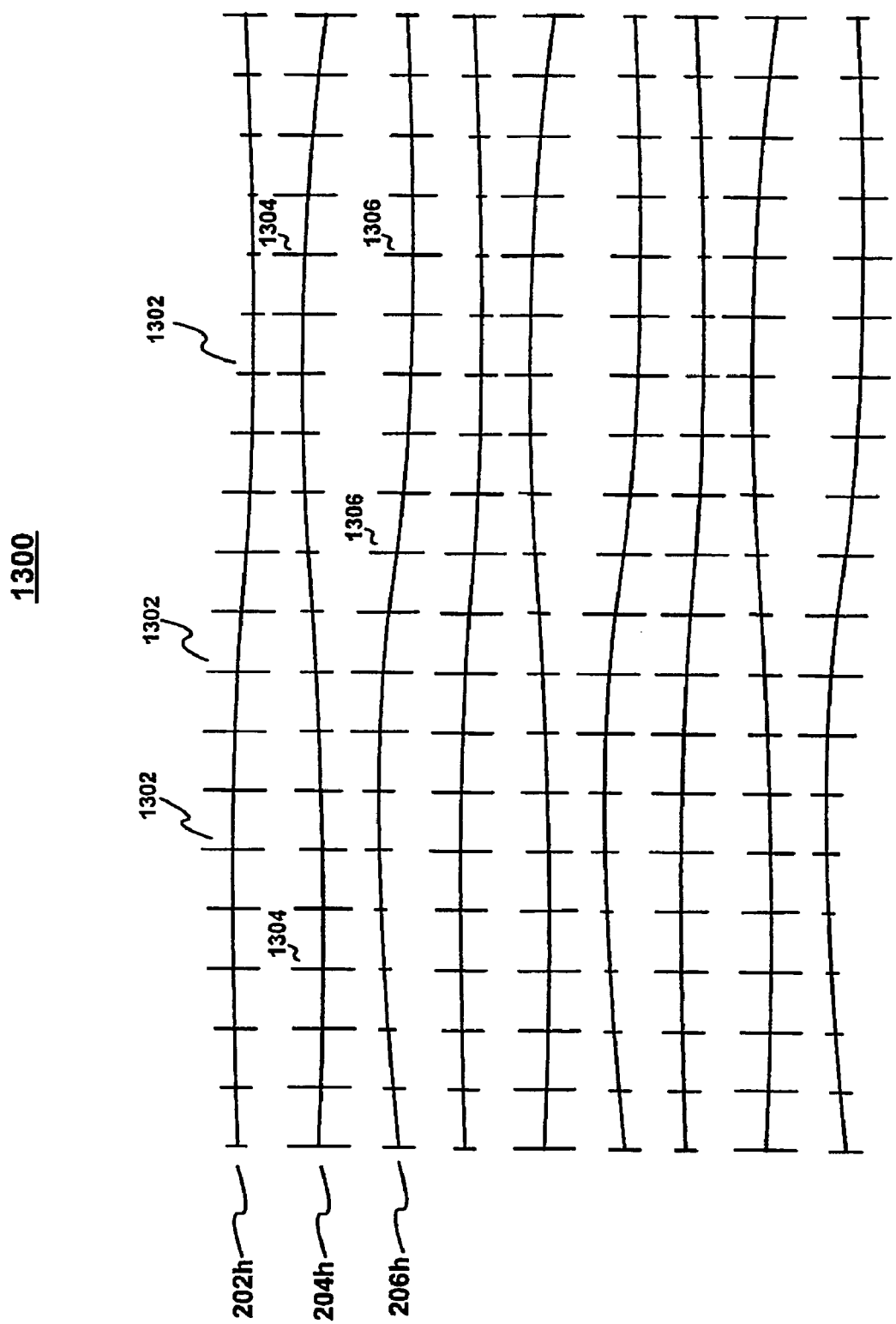
FIG. 13 illustrates an exemplary "fishbone" capacitive sensor pattern in accordance with embodiments of the invention.

FIG. 13 is a plan view of an exemplary "fishbone" capacitive sensor pattern 1300 in accordance with embodiments of the invention. Specifically, sensor pattern 1300 includes three repeated patterns of sensing elements 202h, 204h, and 206h having three phases which can be utilized as part of a two-dimensional capacitive sensor apparatus (e.g., 100), such as but not limited to, a touch sensor and/or a touchpad. When electrically coupled, sensor pattern 1300 can provide two-dimensional positioning information that has substantially parallel traces (or sensing elements) with no crossovers. The sensor pattern 1300 can be utilized in any manner similar to that described herein with reference to FIGS. 2 and 4. Additionally, sensor pattern 1300 can be utilized in any manner similar to that described herein, but is not limited to such.

Specifically, sensing element 202h includes extensions 1302 that are substantially parallel to each other and are substantially perpendicular (or non-parallel) to a first axis of sensing element 202h. The extensions 1302 cumulatively define an envelope the shape of a first waveform. The sensing element 204h includes a plurality of extensions 1304 that are substantially parallel to each other and are substantially perpendicular (or non-parallel) to the first axis of sensing element 204h. The extensions 1304 cumulatively define an envelope the shape of a second waveform. The sensing element 206h includes extensions 1306 that are substantially parallel to each other and are substantially perpendicular (or non-parallel) to the first axis of sensing element 206h. The extensions 1306 cumulatively define an envelope the shape of a third waveform.

The repeated sets of sensing elements 202h, 204h, and 206h can be used for determining a first location of an object (e.g., a user's finger, a probe, a stylus, and the like) in relation to sensor pattern 1300 along the first axis of a two-dimensional space. Furthermore, the repeated sets of sensing elements 202*h*, 204*h*, and 206*h* can be used for determining first and second locations of an object in relation to sensor pattern 1300 along the first axis and a second axis of the two-dimensional space, wherein the second axis is substantially non-parallel (or substantially perpendicular) to the first axis.

Within FIG. 13, sensor pattern 1300 can operate in any manner similar to sensor pattern 500 of FIG. 5. Furthermore, the sum of the widths of any three adjacent traces (or sensing elements) of sensor pattern 1300 can be implemented as a substantial constant width. The sensor pattern 1300 can be implemented with a greater or fewer number of sensing elements than shown within the present embodiment. Sensor pattern 1300 and its sensing elements can be implemented in any manner similar to that described herein, but is not limited to such.

Figure 14:
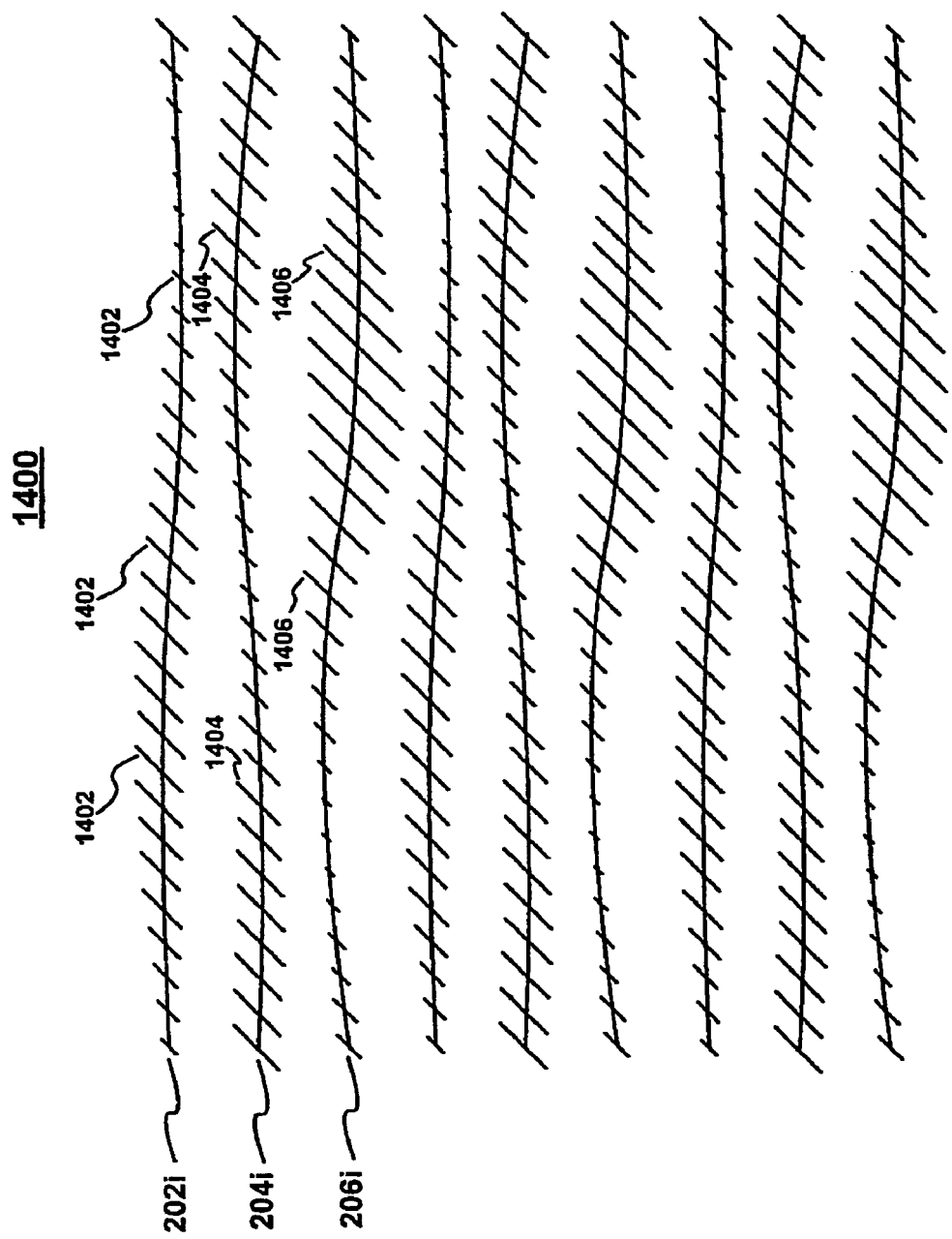
FIG. 14 illustrates another exemplary "fishbone" capacitive sensor pattern in accordance with embodiments of the invention.

FIG. 14 is a plan view of an exemplary "fishbone" capacitive sensor pattern 1400 in accordance with embodiments of the invention. Specifically, sensor pattern 1400 includes three repeated patterns of sensing elements 202*i*, 204*i*, and 206*i* having three phases which can be utilized as part of a two-dimensional capacitive sensor apparatus (e.g., 100), such as but not limited to, a touch sensor and/or a touchpad. When electrically coupled, sensor pattern 1400 can provide two-dimensional positioning information that has substantially parallel traces (or sensing elements) with no crossovers. The sensor pattern 1400 can be utilized in any manner similar to that described herein with reference to FIGS. 2 and 4. Furthermore, sensor pattern 1400 can be utilized in any manner similar to that described herein, but is not limited to such.

Specifically, sensing element 202*i* includes extensions 1402 that are substantially parallel to each other and are substantially non-parallel to a first axis of sensing element 202*i*. The extensions 1402 cumulatively define an envelope the shape of a first waveform. The sensing element 204*i* includes extensions 1404 that are substantially parallel to each other and are substantially non-parallel to the first axis of sensing element 204*i*. The extensions 1404 cumulatively define an envelope the shape of a second waveform. The sensing element 206*i* includes extensions 1406 that are substantially parallel to each other and are substantially non-parallel to the first axis of sensing element 206*i*. The extensions 1406 cumulatively define an envelope the shape of a third waveform.

The repeated sets of sensing elements 202*i*, 204*i*, and 206*i* can be used for determining a first location of an object (e.g., a user's finger, a probe, a stylus, and the like) in relation to sensor pattern 1400 along the first axis of a two-dimensional space. Furthermore, the repeated sets of sensing elements 202*i*, 204*i*, and 206*i* can be used for determining first and second locations of an object in relation to sensor pattern 1400 along the first axis and a second axis of the two-dimensional space, wherein the second axis is substantially non-parallel (or substantially perpendicular) to the first axis.

Within FIG. 14, sensor pattern 1400 can operate in any manner similar to sensor pattern 500 of FIG. 5. Furthermore, the sum of the widths of any three adjacent traces (or sensing elements) of sensor pattern 1400 can be implemented as a substantial constant width. The sensor pattern 1400 can be implemented with a greater or fewer number of sensing elements than shown within the present embodiment. Sensor pattern 1400 and its sensing elements can be implemented in any manner similar to that described herein, but is not limited to such.

Within FIGS. 13 and 14, second axis (e.g., Y axis) sensing elements having substantially constant width can be implemented as part of sensor patterns 1300 and/or 1400. For example, second axis sensing elements can be incorporated with sensor patterns 1300 and/or 1400 in any manner similar to that described herein with reference to FIGS. 6 and 7, but is not limited to such.

Figure 15:
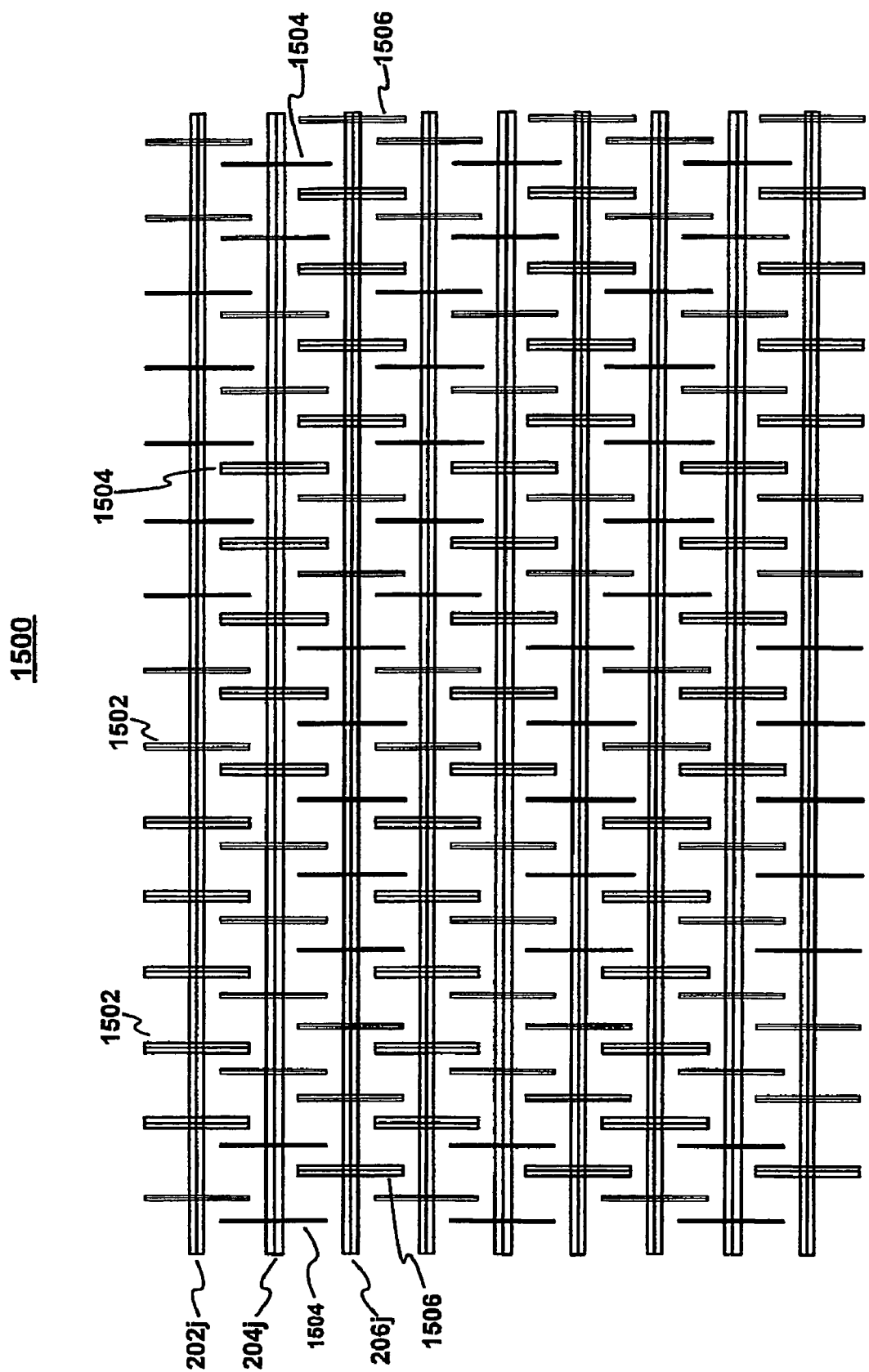
FIG. 15 illustrates yet another exemplary "fishbone" capacitive sensor pattern in accordance with embodiments of the invention.

FIG. 15 is a plan view of an exemplary "fishbone" capacitive sensor pattern 1500 in accordance with embodiments of the invention. Specifically, sensor pattern 1500 includes three repeated patterns of sensing elements 202*j*, 204*j*, and 206*j* having three phases which can be utilized as part of a two-dimensional capacitive sensor apparatus (e.g., 100), such as but not limited to, a touch sensor and/or a touchpad. When electrically coupled, sensor pattern 1500 can provide two-dimensional positioning information that has substantially parallel traces (or sensing elements) with no crossovers. The sensor pattern 1500 can be utilized in any manner similar to that described herein with reference to FIGS. 2 and 4, but is not limited to such. Moreover, sensor pattern 1500 can be utilized in any manner similar to that described herein, but is not limited to such.

Specifically, sensing element 202*j* includes extensions 1502 that are substantially parallel to each other and are substantially perpendicular to a first axis of sensing element 202*j*. The extensions 1502 can each be implemented with a different width that slightly varies with its neighboring extension. As such, a first waveform is defined by the varying widths of the extensions 1502. The sensing element 204*j* includes extensions 1504 that are substantially parallel to each other and are substantially perpendicular to the first axis of sensing element 204*j*. The extensions 1504 can each be implemented with a different width that slightly varies with its neighboring extension. Therefore, a second waveform is defined by the varying widths of the extensions 1504. The sensing element 206*j* includes a plurality of extensions 1506 that are substantially parallel to each other and are substantially perpendicular to the first axis of sensing element 206*j*. The extensions 1506 can each be implemented with a different width that slightly varies with its neighboring extension. As such, a third waveform is defined by the varying widths of the extensions 1506.

Within FIG. 15, the extensions 1502 of sensing element 202*j* are interdigitated with the extensions 1504 of sensing element 204*j*. Moreover, the extensions 1506 of sensing element 206*j* are interdigitated with the extensions 1504 of sensing element 204*j*.

The repeated sets of sensing elements 202*j*, 204*j*, and 206*j* can be used for determining a first location of an object (e.g., a user's finger, a probe, a stylus, and the like) in relation to sensor pattern 1500 along the first axis of a two-dimensional space. Furthermore, the repeated sets of sensing elements 202*j*, 204*j*, and 206*j* can be used for determining first and second locations of an object in relation to sensor pattern 1500 along the first axis and a second axis of the two-dimensional space, wherein the second axis is substantially non-parallel (or substantially perpendicular) to the first axis.

Within FIG. 15, sensor pattern 1500 can operate in any manner similar to sensor pattern 500 of FIG. 5. Additionally, the sensor pattern 1500 can be implemented with a greater or fewer number of sensing elements than shown within the present embodiment. Sensor pattern 1500 and its sensing elements can be implemented in any manner similar to that described herein, but is not limited to such.

Figure 16:
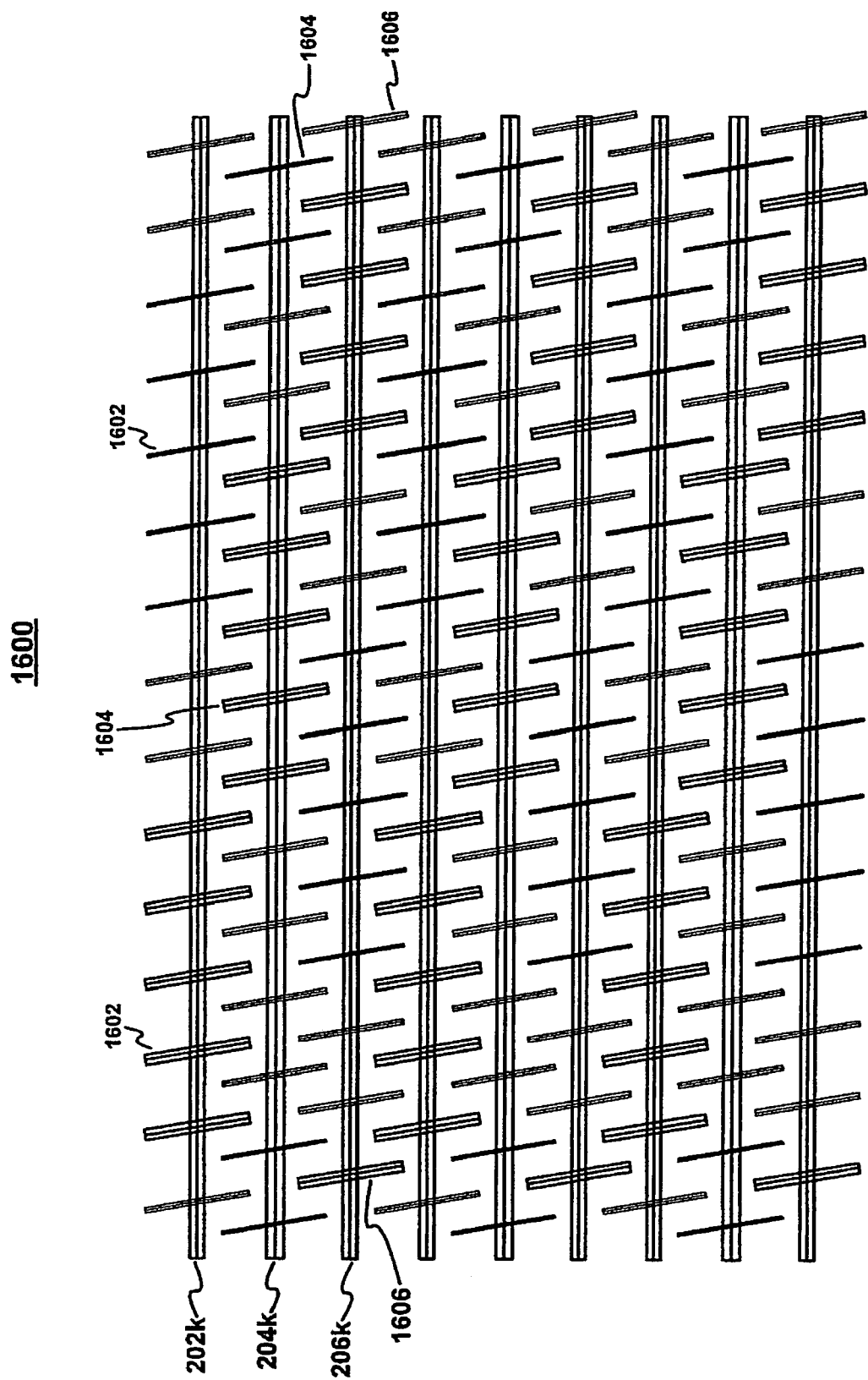
FIG. 16 illustrates still another exemplary "fishbone" capacitive sensor pattern in accordance with embodiments of the invention.

FIG. 16 is a plan view of an exemplary "fishbone" capacitive sensor pattern 1600 in accordance with embodiments of the invention. Specifically, sensor pattern 1600 includes four repeated patterns of sensing elements 202k, 204k, and 206k having three phases which can be utilized as part of a two-dimensional capacitive sensor apparatus (e.g., 100), such as but not limited to, a touch sensor and/or a touchpad. When electrically coupled, sensor pattern 1600 can provide two-dimensional positioning information that has substantially parallel traces (or sensing elements) with no crossovers. The sensor pattern 1600 can be utilized in any manner similar to that described herein with reference to FIGS. 2 and 4, but is not limited to such. Furthermore, sensor pattern 1600 can be utilized in any manner similar to that described herein, but is not limited to such.

Specifically, sensing element 202k includes extensions 1602 that are substantially parallel to each other and are substantially non-parallel to a first axis of sensing element 202k. The extensions 1602 can each be implemented with a different width that slightly varies with its neighboring extension. As such, a first waveform is defined by the varying widths of the extensions 1602. The sensing element 204k includes extensions 1604 that are substantially parallel to each other and are substantially non-parallel to the first axis of sensing element 204k. The extensions 1604 can each be implemented with a different width that slightly varies with its neighboring extension. Therefore, a second waveform is defined by the varying widths of the extensions 1604. The sensing element 206k includes a extensions 1606 that are substantially parallel to each other and are substantially non-parallel to the first axis of sensing element 206k. The extensions 1606 can each be implemented with a different width that slightly varies with its neighboring extension. As such, a third waveform is defined by the varying widths of the extensions 1606.

Within FIG. 16, the extensions 1602 of sensing element 202k are interdigitated with the extensions 1604 of sensing element 204k. Furthermore, the extensions 1606 of sensing element 206k are interdigitated with the extensions 1604 of sensing element 204k.

The repeated sets of sensing elements 202k, 204k, and 206k can be used for determining a first location of an object (e.g., a user's finger, a probe, a stylus, and the like) in relation to sensor pattern 1600 along the first axis of a two-dimensional space. Additionally, the repeated sets of sensing elements 202k, 204k, and 206k can be used for determining first and second locations of an object in relation to sensor pattern 1600 along the first axis and a second axis of the two-dimensional space, wherein the second axis is substantially non-parallel (or substantially perpendicular) to the first axis.

Within FIG. 16, sensor pattern 1600 can operate in any manner similar to sensor pattern 500 of FIG. 5. Furthermore, the sensor pattern 1600 can be implemented with a greater or fewer number of sensing elements than shown within the present embodiment. Sensor pattern 1600 and its sensing elements can be implemented in any manner similar to that described herein, but is not limited to such.

FIG. 17 is a plan view of an exemplary capacitive sensor pattern 1700 in accordance with embodiments of the present invention. In one embodiment, sensor pattern 1700 includes a number of electrically conductive sensing elements 1701, 1702, 1703, 1704, 1705 and 1706 that have widths that vary and lengths that traverse a sensing region (e.g., sensing region 108 of FIG. 1). The sensing elements 1701–1706 are similar to the types of sensing elements previously described herein, such as sensing elements 202, 204 and 206 of FIG. 2. In one embodiment, the sensing elements 1701–1706 are adjacent each other; that is, they do not overlap. In the illustrated embodiment, the widths of the sensing elements 1701a, 1701b and 1702–1706 are sinusoidal functions of position, although the present invention is not so limited.

With reference to FIG. 17, the sensing element 1701 includes a first variable-width portion 1701a disposed adjacent a first edge of the sensing region, and a second variable-width portion 1701b disposed adjacent a second edge of the sensing region opposite the first edge. An advantage of the sensor pattern 1700 is that the potential for an ambiguous sensor response is reduced or eliminated, by making the sensor response along the edges of the sensing region more like the sensor response in the interior of the sensing region.

As shown in FIG. 18, the sensing elements 1702–1706 output a respective sensor signal 1802, 1803, 1804, 1805 and 1806. A sensor signal 1801a that is output from the first portion 1701a and a sensor signal 1801b that is output from the second portion 1701b are combined to provide a sensor signal.

In the present embodiment, the sensor signals 1802 and 1805 are combined (signal "B"), the sensor signals 1803 and 1806 are combined (signal "C"), and the sensor signals 1801a, 1801b and 1804 are combined (signal "A"). Signals can be combined in a variety of ways. For example, the sensor signals can be combined by connecting the outputs of two or more sensing elements to the same electrical conductor (e.g., a conductive coupling trace or lead wire). That is, with reference to FIG. 18, sensing elements 1701a and 1701b can be electrically connected to a same conductor to combine the signals 1801a and 1801b. Alternatively, some measure of the strength of the sensor signals can be mathematically combined (e.g., added). That is, for example, a capacitance (or current, voltage, etc.) measured for signal 1801a can be added to a capacitance (or current, voltage, etc.) measured for signal 1801b.

The signals A, B and C can be used to determine a location (or position) of an object or finger relative to sensor pattern 1700 using, for example, the methodology described above in conjunction with FIG. 4. In addition to determining position, or as an alternative to determining position, the rate of movement of an object or finger relative to sensor pattern 1700 can be determined. As mentioned above, the widths of the sensing elements 1701a, 1701b and 1702–1706 may be sinusoidal functions of position. In the embodiment of FIG. 17, a waveform of a single cycle or period is illustrated. Finer rate measurements can be achieved by using waveforms having multiple cycles (see sensing elements 302, 304 and 306 of FIG. 3, for example).

In one embodiment, the surface area of sensing element 1701 (consisting of the combined surface area of portions 1701a and 1701b) is approximately equal to the surface area of sensing element 1704; the surface area of sensing element 1702 is approximately equal to the surface area of sensing element 1705; and the surface area of sensing element 1703 is approximately equal to the surface area of sensing element 1706. In one embodiment, the combined surface area of the sensing elements 1702 and 1705 is essentially the same as the combined surface area of sensing elements 1703 and 1706, which in turn is essentially the same as the combined surface area of sensing elements 1701 and 1704. By balancing the surface areas of the sensing elements in this manner, in an "idle" state (that is, in a state in which a finger or object is not in proximity to the capacitive sensing apparatus), each of the signals A, B and C will have approximately the same background capacitance, and would be expected to experience a similar response when a finger or object is placed in proximity. However, embodiments in accordance with the present invention are not limited to equally sized sensing elements.

In one embodiment, the surface area of the portion 1701a is approximately the same as the surface area of the portion 1701b; that is, the sensing element 1701 is divided into two, approximately equal portions 1701a and 1701b. However, the sensing element may instead be divided into unequally sized portions.

In one embodiment, sensor pattern 1700 also includes a guard trace 1716 along the perimeter of the sensing region. The guard trace 1716 may be electrically driven, grounded, and/or held at a substantially fixed or constant potential. The guard trace 1716 functions to reduce the effect of a fringing electrical field on the conductive coupling trace connected to the sensing portions 1701a and 1701b, thereby reducing any mismatch between the various conductive coupling traces.

Although sensor pattern 1700 is illustrated as being rectilinear in shape, the present invention is not so limited. Other shapes, such as but not limited to those described by the figures discussed above, may be used. Also, although the sensing elements 1701–1706 are illustrated as traversing the sensing region in the larger ("length") dimension, the present invention is not so limited. That is, the sensing elements 1701–1706 may instead traverse the sending region in the shorter ("width) dimension.

Figure 19:
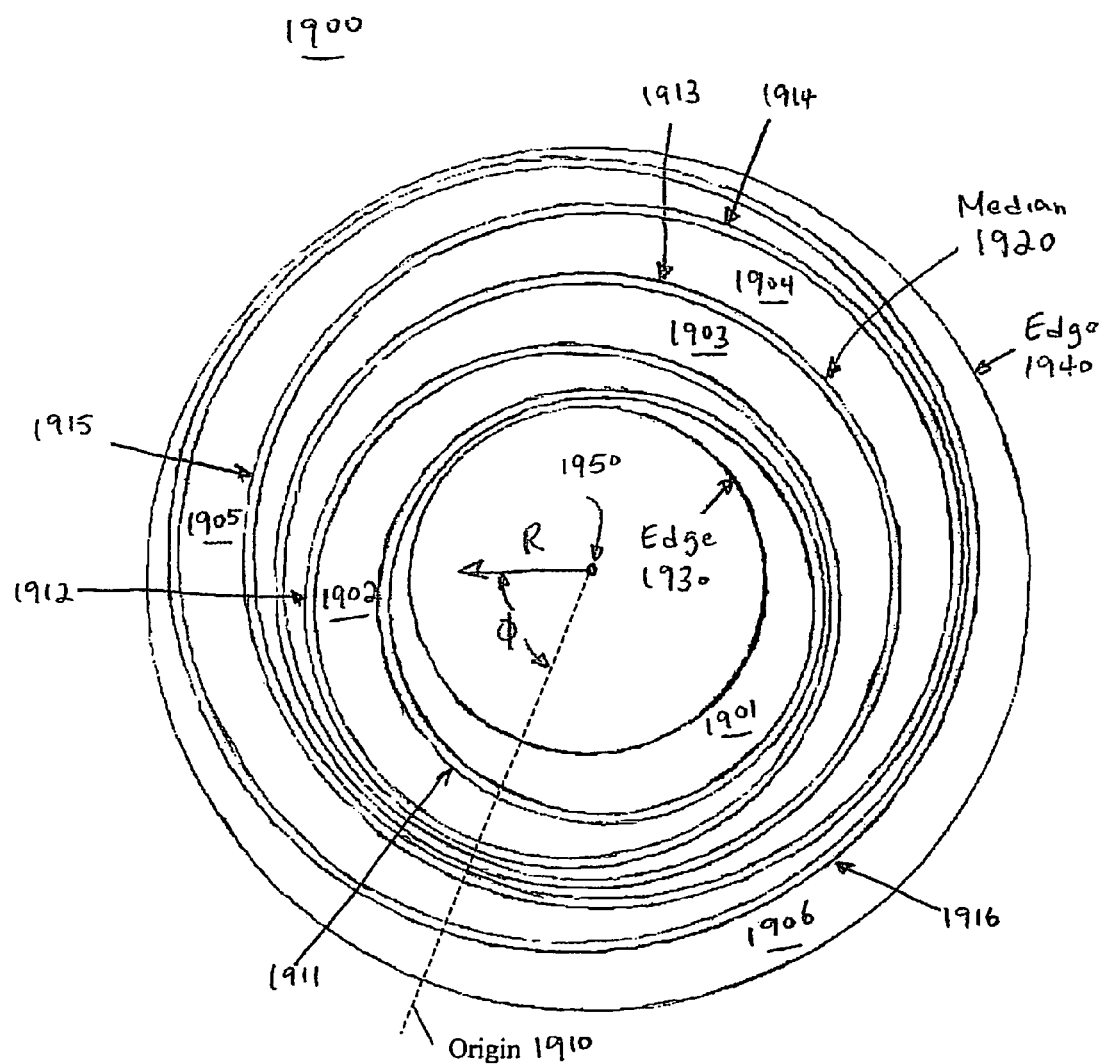
FIG. 19 illustrates another exemplary capacitive sensor pattern in accordance with embodiments of the present invention.

FIG. 19 is a plan view of an exemplary capacitive sensor pattern 1900 in accordance with embodiments of the present invention. In one embodiment, sensor pattern 1900 includes a number of electrically conductive sensing element portions 1901, 1902, 1903, 1904, 1905 and 1906 that have widths that vary and lengths that traverse a sensing region. As will be seen by the discussion below, in one embodiment, the sensing element portions 1901 and 1906 are electrically coupled to constitute a first sensing element; the sensing element portions 1902 and 1905 are electrically coupled to constitute a second sensing element; and the sensing element portions 1903 and 1904 are electrically coupled to constitute a third sensing element.

The sensing element portions 1901–1906 are similar to the types of sensing elements previously described herein, such as sensing elements 202d, 204d and 206d of FIG. 9. In one embodiment, the sensing element portions 1901–1906 are adjacent each other; that is, they do not overlap.

In the illustrated embodiment, the sensing region is circular in shape (e.g., ring-shaped), with widths that vary in the radial direction R. In this embodiment, the perimeters 1911, 1912, 1913, 1914, 1915 and 1916 of the sensing element portions 1901–1906, respectively, form a series of nested circles that have different center points.

The sensing element portions 1901–1906 output respective sensor signals (not shown). In one embodiment, the sensor signals generated by sensing element portions 1903 and 1904 are combined to produce a first combined sensor signal; the sensor signals generated by sensing element portions 1902 and 1905 are combined to produce a second combined sensor signal; and the sensor signals generated by sensing element portions 1901 and 1906 are combined to produce a third combined sensor signal. As discussed in conjunction with FIG. 17 above, signals can be combined in a variety of ways. The three signals so produced can be used to determine an angular position $\phi$, measured from an arbitrarily selected origin 1910, and a radial position R, measured from the center point 1950, of an object or finger relative to sensor pattern 1900. The radial and angular positions can be determined in a manner similar to that described above in conjunction with FIGS. 9 and 10. Furthermore, the rate of movement of an object or finger relative to sensor pattern 1900 can be determined.

In essence, the sensing element portions 1901–1906 are arranged in a particular pattern within sensor pattern 1900, where that pattern corresponds to the manner in which the respective sensor signals are combined. To illustrate, if the sensing element portions 1903 and 1904 (which contribute to the first combined sensor signal) are each identified using the letter "A," the sensing element portions 1902 and 1905 (which contribute to the second combined sensor signal) are each identified using the letter "B," and the sensing element portions 1901 and 1906 (which contribute to the third combined sensor signal) are each identified using the letter "C," then the sensing element portions 1901–1903 form a first pattern CBA and the sensing element portions 1904–1906 form a second pattern ABC. The first and second pattern are said to be bilaterally symmetrical about the median 1920, where the median 1920 is approximately equidistant from the two edges 1930 and 1940.

By arranging the sensing element portions 1901–1906 in the manner just described, the number of conductive coupling traces can be reduced. For example, instead of six traces (one trace per sensing element portion), five traces can be used (sensing element portions 1903 and 1904 can be connected to the same conductive coupling trace).

In one embodiment, the surface areas of the respective sensing elements are sized so that each pair of coupled sensing element portions has approximately the same surface area as the other pairs of coupled sensing element portions. That is, in the embodiment of FIG. 19, the combined surface area of sensing element portions 1901 and 1906 is essentially the same as the combined surface area of sensing element portions 1902 and 1905, which in turn is essentially the same as the combined surface area of sensing element portions 1903 and 1904. By balancing the surface areas of the sensing elements in this manner, in an "idle" state (that is, in a state in which a finger or object is not in proximity to the capacitive sensing apparatus), the aforementioned first, second and third combined signals will have approximately the same background capacitance, and would be expected to experience a similar response when a finger or object is placed in proximity.

The width (as measured in the radial direction) of each of the sensing element portions 1901–1906, and in particular the widths of the adjacent and electrically coupled sensing element portions 1903 and 1904, can be selected so that the sensing elements are discrete enough to determine the radial position of a finger or object proximate to the sensing region.

Other shapes, such as but not limited to those described by the figures discussed above, may be used instead of the circular shape illustrated in FIG. 19. For example, sensor pattern 1900 can be rectilinear in shape—in effect, though not necessarily in actual practice, the pattern 1900 can be cut along origin 1910, for example, and then straightened into a rectangular shape, allowing for lengthening of the inner sensing elements relative to the outer sensing elements. If rectilinear, the widths of the sensing element portions 1901–1906 may be sinusoidal functions of position, although the present invention is not so limited. The aforementioned ABC-CBA arrangement of the sensing elements in the first and second patterns, which provides bilateral symmetry about a median that is equidistant from the edges of the sensing region, can be maintained for shapes other than circular shapes.

Although described for six sensing element portions (constituting three sensing elements), the present invention is not so limited; that is, more than six or less than six sensing element portions can be used to form the three sensing elements (also, more than three sensing elements may be used). Furthermore, the sensing element portions may be arranged in more than two bilaterally symmetrical patterns. For example, consider a sensing apparatus that uses 12 sensing element portions. The 12 sensing element portions may be grouped into three groups: the first group consisting of the first three adjacent element portions, the second group consisting of the next six adjacent element portions, and the third group consisting of the last three adjacent element portions. The six sensing element portions in the second group can be arranged in a first and second pattern CBA-ABC as described above, and the three sensing element portions in the first group can be arranged in a third pattern as FED with the three sensing element portions in the third group arranged in a fourth pattern as DEF. The first and second patterns are bilaterally symmetrical, and the third and fourth patterns are bilaterally symmetrical. Other arrangements of sensing element portions are possible.

Figure 20:
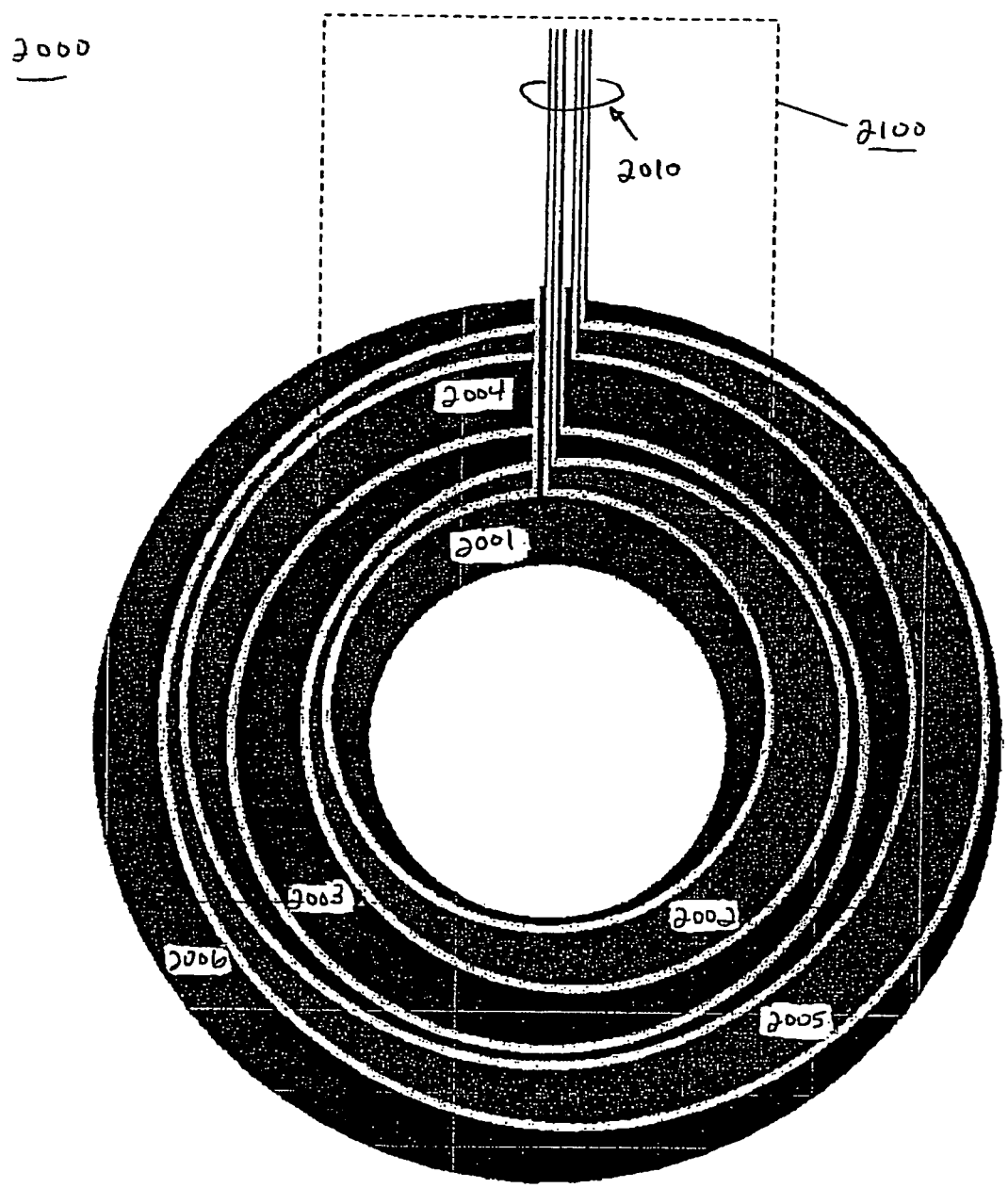
FIG. 20 illustrates another exemplary capacitive sensor pattern in accordance with embodiments of the present invention.

FIG. 20 is a plan view of an exemplary capacitive sensor pattern 2000 in accordance with embodiments of the present invention. In general, sensor pattern 2000 includes a number of electrically conductive sensing elements or sensing element portions 2001, 2002, 2003, 2004, 2005 and 2006. The sensing elements 2001–2006 are similar to the types of sensing elements previously described herein, such as sensing elements 202d, 204d and 206d of FIG. 9 or sensing element portions 1901–1906 of FIG. 19.

The conductive coupling traces 2010 are routed through respective gaps in the surrounding sensing elements. That is, for example, a conductive coupling trace connected to sensing element 2001 is routed through gaps in sensing elements 2002–2006, a conductive coupling trace connected to sensing element 2002 is routed through gaps in sensing elements 2003–2006, and so on.

By routing the traces 2010 through gaps in the surrounding sensing elements, sensor pattern 2000 can be implemented in a single layer of conductive material. Consequently, a second conductive layer for signal routing, as well as vias connecting the conductive layers, can be eliminated, reducing manufacturing costs. Indeed, sensor pattern 2000 can be manufactured using conventional printed circuit board techniques to provide the sensing elements and coupling traces in the desired pattern on the single conductive layer.

Figure 21:
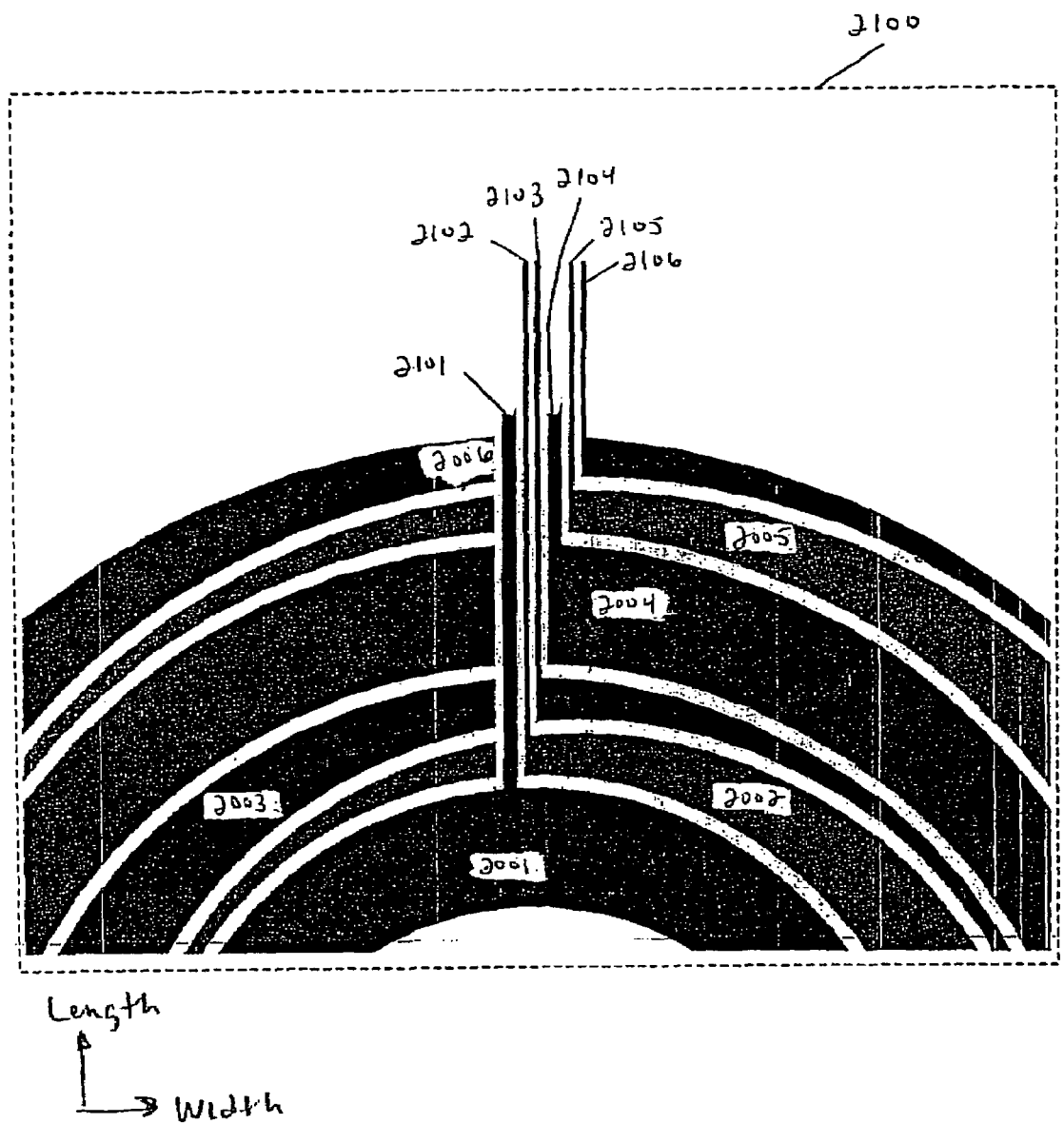
FIG. 21 illustrates a close-up of a portion of the pattern of FIG. 20 in accordance with embodiments of the present invention.

FIG. 21 is a close-up view of the region 2100 of FIG. 20, showing the various conductive coupling traces 2101, 2102, 2103, 2104, 2105 and 2106 connected to the sensing elements 2001–2006, respectively. As would be expected, the gap dimension (e.g., the gap width) in, for example, sensing element 2006 is greater than that of sensing element 2002, because only a single coupling trace passes through sensing element 2002, while multiple coupling traces pass through sensing element 2006. Therefore, according to embodiments of the present invention, the dimensions of the conducting traces 2102–2106 are selected to compensate for the size of the gap in the sensing element to which they are connected.

For example, presuming the conductive traces and the sensing elements are of the same depth, then the dimensions (e.g., length and width) of conductive trace 2106 are selected such that an areal measure of conductive trace 2106 is approximately equal to the surface area of sensing element 2006 that is lost or displaced because of the routing of the other conductive traces. Similarly, the length and width of conductive trace 2105 are selected such that an areal measure of conductive trace 2105 is approximately equal to the surface area of sensing element 2005 that is lost or displaced because of the routing of the other conductive traces. The dimensions of the other conductive traces 2102–2104 are similarly selected.

There is not a gap in the sensing element 2001; thus, the dimensions of conductive trace 2101 can be selected based on other design considerations. For example, in an embodiment in which it is desirable that the surface area of each sensing element is approximately the same, then conductive trace 2101 can be dimensioned such that its surface area plus the surface area of sensing element 2001 is approximately equal to the combined surface area of conductive trace 2102 and sensing element 2002, and so on.

By using the areal measures of the conductive traces to balance the surface areas of the sensing elements in the manner described above, in an "idle" state (that is, in a state in which a finger or object is not in proximity to the capacitive sensing apparatus), each sensing element 2001–2006 will have approximately the same background capacitance, and would be expected to experience a similar response when a finger or object is placed in proximity.

Other shapes, such as but not limited to those described by the figures discussed above, may be used instead of the circular shape illustrated in FIG. 20. For example, sensor pattern 2000 can be rectilinear in shape.

In conclusion, embodiments in accordance with the present invention pertain to capacitive sensing apparatuses that can reduce manufacturing costs, can sense position unambiguously, and/or can provide balanced signals across the various sensing elements.

The various sensor patterns described herein can each include a non-conductive region formed by two or more adjacent sensing elements. Furthermore, the various sensor patterns described herein may each be operated with very few sensor channels. This can offer substantial cost savings if there is a desire to use a low pin-count package, or build a simplified sensor ASIC (application-specific integrated circuit) for a capacitive sensor device or apparatus.

Moreover, the various sensor patterns described herein can each provide a capacitive sensing geometry that does not induce signal-to-noise ratio concerns. Additionally, the sensor patterns may each be used to detect objects on either side of the substrate onto which it is fabricated. To prevent detection of signals of noise from one side of the substrate, a ground plane or a driven shield conductor may be utilized with the sensor patterns to shield that side.

In addition, the features of the various embodiments described herein can be used alone or in combination. That is, for example, the features described for one embodiment of a sensor pattern may be appropriately combined with the features described for another embodiment of a sensor pattern.

Furthermore, the sensing region 108 of FIG. 1 is not necessarily limited to the use of a single sensor pattern. In other words, multiple sensors utilizing the same or different sensor patterns can be placed adjacent to each other within sensing region 108.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A capacitive sensing apparatus comprising:

a first sensing element; and a second sensing element having a first gap, wherein a first electrical conductor coupled to said first sensing element passes through said first gap and wherein a second electrical conductor coupled to said second sensing element is dimensioned such that a capacitive coupling to said second sensing element is compensated for said first gap.

2. The capacitive sensing apparatus of claim 1 wherein an areal measure of said second electrical conductor is substantially equal to an areal measure of said first gap.

3. The capacitive sensing apparatus of claim 1 further comprising a third sensing element having a second gap, wherein said first and second electrical conductors pass through said second gap and wherein a third electrical conductor coupled to said third sensing element is dimensioned such that a capacitive coupling to said third sensing element is compensated for said second gap.

4. The capacitive sensing apparatus of claim 3 wherein said first and third electrical conductors are connected to each other to combine a sensor signal output from said first sensing element and a sensor signal output from said third sensing element.

5. The capacitive sensing apparatus of claim 3 wherein a measure of a sensor signal output from said first sensing element is added to a measure of a sensor signal output from said third sensing element to provide a combined output signal.

6. The capacitive sensing apparatus of claim 1 wherein said first and second sensing elements have widths that vary and lengths that traverse a sensing region.

7. The capacitive sensing apparatus of claim 6 further comprising circuitry coupled to said plurality of sensing elements, said circuitry operable to use signals output by said first and second sensing elements to determine an unambiguous position along an axis in the lengthwise dimension of said sensing region.

8. The capacitive sensing apparatus of claim 7 wherein said position is also determined along an axis in the widthwise dimension of said sensing region.

9. The capacitive sensing apparatus of claim 6 further comprising circuitry coupled to said plurality of sensing elements, said circuitry operable to use signals output by said first and second sensing elements to determine a rate of movement of an object proximate to said sensing region.

10. The capacitive sensing apparatus of claim 6 wherein said sensing region is ring-shaped.

11. The capacitive sensing apparatus of claim 6 wherein said sensing region is rectilinear in shape.

* * * * *

UNITED STATES PATENT AND TRADEMARK OFFICE
CERTIFICATE OF CORRECTION

| | | |
|---|---|---|
| PATENT NO. | : 7,218,124 B1 | Page 1 of 1 |
| APPLICATION NO. | : 11/343452 | |
| DATED | : May 15, 2007 | |
| INVENTOR(S) | : Mackey | |

It is certified that error appears in the above-identified patent and that said Letters Patent is hereby corrected as shown below:

Title Page, Item (12) delete "Mackey, et al." and insert -- Mackey --.

Title Page, Item (75) Inventors:

should read

-- (75) Inventor: Bob Lee Mackey, San Jose, CA (US) --.

Signed and Sealed this
Sixth Day of October, 2015

Michelle K. Lee
*Director of the United States Patent and Trademark Office*